United States Patent
Yano et al.

(12) 
(10) Patent No.: US 6,460,989 B1
(45) Date of Patent: Oct. 8, 2002

(54) INK SET, FORMATION OF COLORED AREA ON RECORDING MEDIUM, AND INK-JET RECORDING APPARATUS

(75) Inventors: Kentaro Yano, Yokohama; Yutaka Kurabayashi, Higashimurayama; Yuji Kondo, Machida; Masao Kato, Utsunomiya; Hiroshi Tomioka, Tokyo; Mitsuhiro Ono, Yokohama; Makiko Endo, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,483

(22) Filed: Nov. 9, 2000

(30) Foreign Application Priority Data

Nov. 12, 1999 (JP) ............................................. 11-323330

(51) Int. Cl.[7] ................................................. B41J 2/01
(52) U.S. Cl. ......................... 347/101; 347/100; 347/96
(58) Field of Search ................................. 347/100, 101, 347/96; 106/31.58

(56) References Cited

U.S. PATENT DOCUMENTS

| | | | |
|---|---|---|---|
| 4,202,870 A | 5/1980 | Weber et al. ............... 423/630 |
| 4,242,271 A | 12/1980 | Weber et al. ............... 260/448 |
| 4,694,302 A | 9/1987 | Hackleman et al. ......... 346/1.1 |
| 4,723,129 A | 2/1988 | Endo et al. .................. 346/1.1 |
| 5,549,740 A | * 8/1996 | Takahashi et al. .......... 347/100 |
| 5,614,007 A | 3/1997 | Kurabayashi et al. ..... 106/22 R |
| 5,618,338 A | * 4/1997 | Kurabayashi et al. ....... 347/100 |
| 5,623,294 A | 4/1997 | Takizawa et al. ............. 347/98 |
| 5,624,484 A | 4/1997 | Takahashi et al. ....... 106/31.75 |
| 5,640,187 A | 6/1997 | Kashiwazaki et al. ...... 347/101 |
| 5,700,314 A | 12/1997 | Kurabayashi et al. .... 106/31.27 |
| 5,792,249 A | 8/1998 | Shirota et al. ........... 106/31.27 |
| 5,835,116 A | 11/1998 | Sato et al. .................... 347/98 |
| 5,985,975 A | 11/1999 | Kurabayashi et al. ....... 524/462 |
| 6,027,210 A | 2/2000 | Kurabayashi et al. ....... 347/100 |
| 6,074,052 A | 6/2000 | Inui et al. .................... 347/101 |
| 6,238,045 B1 | 5/2001 | Ono et al. ..................... 347/96 |

FOREIGN PATENT DOCUMENTS

| | | | |
|---|---|---|---|
| EP | 0 663 299 A2 | 7/1995 | |
| EP | 0 675 178 A2 | 10/1995 | |
| EP | 0726158 A1 | * 8/1996 | ............. B41J/2/21 |
| EP | 0 936 259 A1 | 8/1999 | |
| JP | 61-59911 B2 | 5/1979 | |
| JP | 61-59912 B2 | 5/1979 | |
| JP | 61-59914 B2 | 2/1980 | |
| JP | 55-65269 | 5/1980 | |
| JP | 55-66976 | 5/1980 | |
| JP | 55-150396 | 11/1980 | |
| JP | 63-22681 | 1/1988 | |
| JP | 63-60783 | 3/1988 | |
| JP | 63-299971 | 12/1988 | |
| JP | 64-9279 | 1/1989 | |
| JP | 64-63185 | 3/1989 | |
| JP | 4-259590 | 9/1992 | |
| JP | 6-92010 | 4/1994 | |
| JP | 8-72393 | 3/1996 | |
| JP | 8-224955 | 9/1996 | |

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

This invention relates to an ink set which can form a colored area on a recording medium with a broad color reproduction range, excellent uniformity of the colors, with effective prevention of bleeding at the boundary between adjacent different color areas on a recording medium, and high rub-off resistance of the colored area. The ink set has separately an aqueous anionic or cationic ink containing a coloring material, and a liquid composition containing fine particles dispersed therein and electrically charged at the surface in a polarity opposite to the ink. The ink and the liquid composition are adjusted to give, when mixed at a mixing weight ratio of about 1:1, a pH of the liquid mixture to cause aggregation of at least the coloring material.

32 Claims, 10 Drawing Sheets

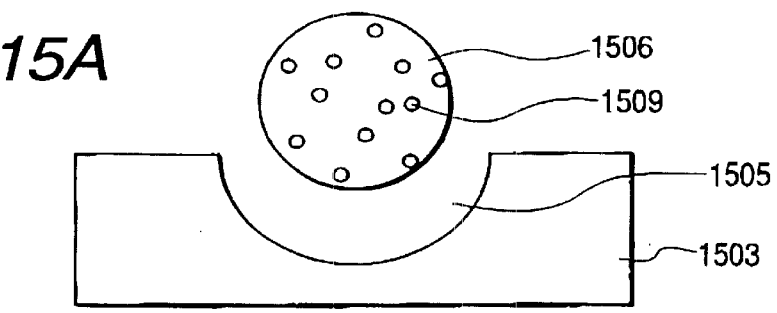
FIG. 15A
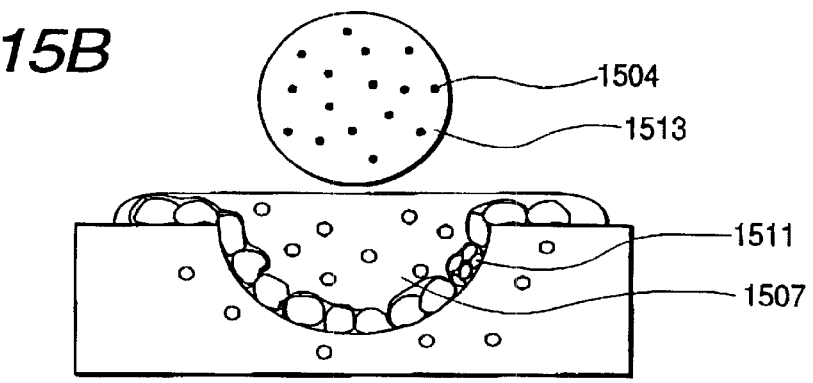
FIG. 15B
FIG. 15C 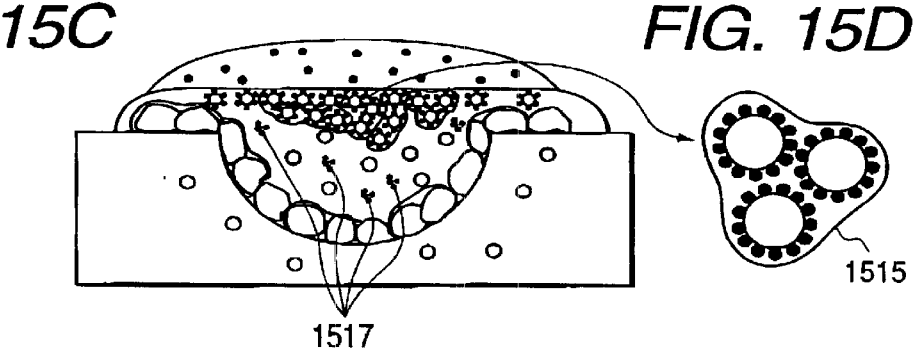 FIG. 15D
FIG. 15E
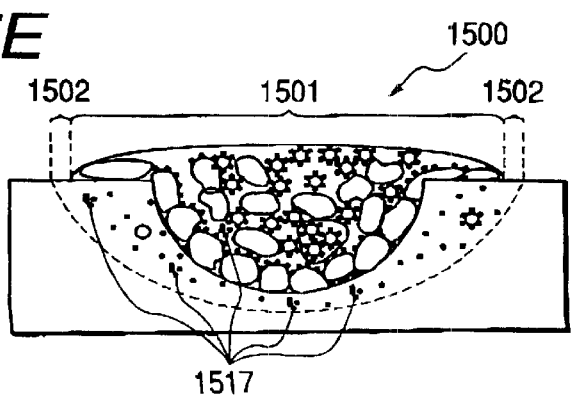

INK SET, FORMATION OF COLORED AREA ON RECORDING MEDIUM, AND INK-JET RECORDING APPARATUS

BACKGROUND OF THE INVENTION

1. Field of the Invention

The present invention relates to a technique for forming a color image with excellent color development and color uniformity Particularly, the present invention relates to an ink set comprising a liquid composition and an aqueous color ink suitable for image formation by an ink-jet recording system, a method for forming a colored area on a recording medium; and an ink-jet recording apparatus employing the ink set.

2. Related Background Art

The ink-jet recording system conducts recording by ejecting an ink onto a recording medium like a paper sheet. For example, ink-jet recording systems which employ an electro-thermal transducer as an ejection energy supplying means and eject liquid droplets by forming bubbles in the ink with thermal energy applied to the ink are disclosed in Japanese Patent Publication Nos. 61-59911, 61-59912, and 61-59914. In such an ink-jet recording system, the recording head orifice can readily be multiplied in a high density to obtain images with high resolution and high quality at a high speed.

In conventional ink-jet recording systems, the ink is mainly composed of water and contains a water-soluble high-boiling solvent such as glycol to prevent drying of ink in the nozzle and clogging of the nozzle, and for other purposes. Such an ink may cause problems of incomplete fixation of the ink, or nonuniformity of the formed image presumably caused by nonuniform distribution of a filler or a sizing agent on the face of a recording medium paper sheet. On the other hand, in recent years, the ink-jet recorded image is required to have a high image quality comparable to that of silver salt photograph and greatly demanded technically to give a higher image density and a broader color reproduction range of the ink-jet recorded image, and higher uniformity of the color of the recorded image In such circumstances, many methods are proposed for stabilization of the ink-jet recording and improvement of the quality of ink-jet recorded matters One of the proposals concerning the recording medium is a method of coating the base paper of the recording medium with a filler or a sizing agent on the surface thereof. For example, porous fine particles capable of adsorbing a coloring material are applied as a filler on the base paper to form an ink-receiving layer. Coated paper for ink-jet recording is commercially available as the recording medium produced by employing such techniques.

Other typical methods are summarized below.

(1) Incorporation of a Volatile Solvent, or a Penetrative Solvent Into an Ink:

Japanese Patent Application Laid-Open No. 55-65269 discloses adding a compound which promotes penetration of a surfactant or the like to the ink for accelerating fixation of the ink on the recording medium. Japanese Patent Application Laid-Open No. 55-66976 discloses using an ink mainly composed of a volatile solvent (2) Mixing of an Ink with a Liquid Composition Reactive to the Ink on a Recording Medium.

An image-improving liquid composition is applied on a recording medium, before or after application of a recording ink, to improve image density and water resistance and to prevent bleeding.

Japanese Patent Application Laid-Open No. 63-60783 discloses preliminary application of a basic polymer-containing liquid composition and subsequent recording with an ink containing an anionic dye. Japanese Patent Application Laid-Open No. 63-22681 discloses a recording method in which a first liquid composition containing a reactive chemical species and a second liquid composition containing a compound capable of reacting with the reactive chemical species are mixed on a recording medium. Japanese Patent Application Laid-Open No. 63-299971 discloses preliminary application of a liquid composition containing an organic compound having two or more cationic groups per molecule onto a recording medium and subsequent recording with an ink containing an anionic dye. Japanese Patent Application Laid-Open No. 64-9279 discloses a recording method in which an acidic liquid composition containing succinic acid or the like is applied onto a recording medium and subsequently recording is conducted with an ink containing an anionic dye.

Japanese Patent Application Laid-Open No. 64-63185 discloses application of a liquid composition capable of insolubilizing an ink dye before recording with an ink. Japanese Patent Application Laid-Open No. 8-224955 discloses using a liquid composition containing cationic substances of different molecular distribution regions in combination with an ink containing an anionic compound. Japanese Patent Application Laid-Open No. 8-72393 discloses using a liquid composition containing a cationic substance and finely pulverized cellulose in combination with an ink. These methods are said to give good images which are high in the image density, better in the print quality and water resistance, and also better in the color reproducibility and non-bleeding. Japanese Patent Application Laid-Open No. 55-150396 discloses, after recording with a dye ink on a recording medium, applying a water resistance-imparting agent which forms a lake by reaction with the dye to improve the water resistance of a recorded image.

(3) Mixing of an Ink with a Fine Particle-containing Liquid Composition on a Recording Medium:

Japanese Patent Application Laid-Open No. 4-259590 discloses applying a colorless liquid containing colorless inorganic fine particles on a recording medium and subsequently applying a nonaqueous recording liquid thereto. Japanese Patent Application Laid-Open No. 6-92010 discloses a method in which a solution containing fine particles or a solution containing fine particles and a binder polymer is first applied to a recording medium and subsequently an ink containing a pigment, a water-soluble resin, a water-soluble solvent and water is applied thereto. These methods are said to give images with better print quality and color development, irrespective of the kind of paper used.

Background Technique

The inventors of the present invention, after comprehensive investigation on various ink-jet recording techniques as mentioned above, have found that the above described methods achieve remarkable effects in solving the respective technical problems, but other important ink-jet recording properties may be impaired instead. For example, the above technique (1) improves fixation of an ink on a recording medium, but the Image density may become deteriorated, and the color reproduction range which is important in recording on plain paper or recording a color image may become insufficient. The above technique (2) gives high image density owing to the coloring material of the ink made to remain on the surface of a recording medium, but the color reproduction range or color chroma may be lowered, presumably owing to aggregation of the coloring material on the surface of the recording medium.

The aforementioned recording medium having a base paper the surface of which is coated with a filler or a sizing agent (hereinafter referred to as "coated paper") is recognized to be capable of forming a high-quality image.

Generally, for obtaining an image of high chroma, it is known that the coloring material should be left on the surface of a recording medium in a monomolecular state without being aggregated. The fine porous particles of the coated paper serve surely to make the coloring material to remain on the recording medium surface. However, for achieving a high image density and high image chroma, a larger amount of the porous fine particles is required to form an ink-receiving layer with a thickness enough to cover the base paper, which gives rise to a disadvantageous problem that the feel or texture of the base paper sheet is lost. The inventors have presumed that such a thick ink-receiving layer is required because the coloring material is not effectively adsorbed to the porous fine particles.

For the explanation below, a coated paper is taken which has a single ink-receiving layer. FIG. 9 shows schematically a cross section of the surface and its vicinity of the coated paper. In FIG. 9, the numeral 901 denotes a base paper sheet, and the numeral 903 denotes an ink-receiving layer. The ink receiving layer 903 contains porous fine particles 905 and an adhesive 907 for fixing the porous fine particles. The ink applied on the paper penetrates into interstices or air gaps between the porous fine particles 905 by capillarity to form ink penetration regions 909. Since the density of the porous fine particles in the ink-receiving layer differs with the places as shown in FIG. 9, the way of penetration of the ink by the capillarity also varies depending on the places. Therefore, in the process of penetration of the ink, the colorant is not brought Into uniform contact with the surface of the porous fine particles, resulting in ineffective adsorption of the colorant by the porous fine particles.

Moreover, the adhesive 907 may hinder the penetration of the ink in some portions, and those portions to which the ink cannot penetrate may be present in the ink receiving layer, and in this case, portions may be formed which do not take part in the color development.

From the above reasons, in the conventional coated paper, the porous fine particles cannot effectively adsorb the coloring material in a monomolecular state for the amount of the particles used. Therefore, a larger amount of the porous fine particles should be used for obtaining a high-quality image, which impairs the feel of the base paper.

Based on the new knowledge as mentioned above, the inventors have found that the coloring material and the fine particles are caused to react with each other in a liquid-liquid state by using the fine particles capable of adsorbing the coloring material and, to cause the fine particles to effectively adsorb or bond the coloring material, dispersing the fine particles in a liquid phase for use in conjugation with the ink in a liquid state, and as a result, the density and chroma of the images can be improved.

Another technical problem in ink-jet recording is bleeding. In formation of multicolor images by the ink-jet recording, a plurality of inks which different colors must be applied in superposition or in adjacency on a recording material. In a boundary between the adjacent different color areas, the colors may feather or bleed and cause nonuniform mixing to lower the image quality. Hence, how the bleeding should be prevented is also an important technical problem in providing multi-color images with high quality.

The inventors have made comprehensive investigation to solve the problem of bleeding on the basis of the aforementioned technique of improving the image density and the color chroma by effective adsorption or bonding of the coloring material to the fine particles, and consequently completed the present invention

SUMMARY OF THE INVENTION

An object of the present invention is to provide an ink set for obtaining a higher quality, ink-jet record with a high density and a high chrome of the image and with sufficiently controlled bleeding.

Another object of the present invention is to provide a method of forming a colored area on a recording medium with a broad color reproduction range, excellent uniformity of the colors, effectively suppressed bleeding at the boundary between adjacent different color regions on the recording medium, and excellent rub-off resistance of the colored area.

Still another object of the present invention is to provide a method capable of forming a colored area on a recording medium with a broad color reproduction range, excellent uniformity of the colors, effectively controlled bleeding at the boundary between adjacent different color regions on the recording medium, and high rub-off resistance of the image.

A further object of the present invention is to provide an ink-jet recording apparatus which can form colored area on a recording medium with a broad color reproduction range, excellent uniformity of the colors, effectively suppressed bleeding at the boundary between adjacent different color regions, and excellent rub-off resistance of the image.

A still further object of the present invention is to provide an ink set which is excellent in the shelf stability, ejection stability from a recording head, and ink-jet recording properties.

According to an aspect of the present invention, there is provided an ink set comprising separately an aqueous anionic or cationic ink containing a coloring material, and a liquid composition containing fine particles dispersed therein and electrically charged at the surface in a polarity opposite to the ink, wherein the ink and the liquid composition are adjusted to give, when mixed at a mixing weight ratio of about 1:1, a pH of the liquid mixture to cause the aggregation of at least the coloring material.

According to another aspect of the present invention, there is provided an ink set comprising separately an aqueous anionic or cationic ink containing a coloring material, and a liquid composition containing fine particles dispersed therein and electrically charged at the surface in a polarity opposite to the ink, wherein the pH of the ink and the pH of the liquid composition are adjusted respectively to give, when mixed at a mixing weight ratio of about 1:1, a pH of the liquid mixture to cause aggregation of the coloring material.

According to a further aspect of the present invention, there is provided an ink set comprising separately an anionic or cationic ink containing a coloring material, and a liquid composition containing fine particles reactive to the coloring material in a dispersion state, wherein the fine particles in the liquid composition are capable of adsorbing or bonding the coloring material in the ink on the surface of the fine particles with the coloring material maintaining the molecular state the coloring material has had in the ink when the ink and the liquid composition are mixed in a liquid state, and the ink and the liquid composition are adjusted to give, when mixed for a liquid-liquid reaction, a pH of the liquid mixture to cause the aggregation of the coloring material.

According to still another aspect of the present invention, there is provided an ink set comprising separately an anionic or cationic ink containing a coloring material, and a liquid composition containing fine particles reactive to the coloring material in a dispersion state, wherein the fine particles in the liquid composition are capable of adsorbing or bonding the coloring material in the ink on the surface of the fine particles with the coloring material maintaining the molecular state the coloring material has had in the ink when the ink and the liquid composition are mixed in a liquid state, thereby making the dispersion state unstable to cause the aggregation of the fine particles, and the ink and the liquid composition are adjusted to give, when mixed for a liquid-liquid reaction, a pH of the liquid mixture to cause the aggregation of the coloring material.

According to a still further aspect of the present invention, there is provided an ink set comprising separately an anionic or cationic ink containing a coloring material, and a liquid composition containing fine particles reactive to the coloring material in a dispersion state, wherein the fine particles in the liquid composition are capable of adsorbing the coloring material in the ink in a monomolecular state on the surface of the fine particles when the ink and the liquid composition are mixed in a liquid state, and the ink and the liquid composition are adjusted to give, when mixed for a liquid-liquid reaction, a pH of the liquid mixture to cause the aggregation of the coloring material.

According to still another aspect of the present invention, there is provided a method of forming a colored area on a recording medium comprising a step of ejecting a droplet of an aqueous anionic or cationic ink and a droplet of a liquid composition to the recording medium in such a way that both of the droplets are brought into contact with each other in a liquid-liquid state on the recording medium, said aqueous ink containing a coloring material, said liquid composition containing fine particles dispersed therein and electrically charged at the surface in a polarity opposite to the ink, wherein the aqueous ink and the liquid composition are adjusted to give, when mixed at a mixing weight ratio of about 1:1, a pH of the liquid mixture to cause the aggregation of at least the coloring material.

According to a still further aspect of the present invention, there is provided an ink-jet recording apparatus comprising an ink container containing an aqueous anionic or cationic ink containing a coloring material, a liquid composition container containing a liquid composition containing fine particles dispersed therein and electrically charged at the surface in a polarity opposite to the ink, and heads for separately ejecting the liquid composition and the aqueous ink.

According to still another aspect of the present invention, there is provided an image comprising a colored area, the colored area being formed by a liquid-liquid reaction of an anionic or cationic ink containing a coloring material with a liquid composition containing fine particles reactive to the coloring material in a dispersion state, wherein the colored area contains the fine particles having the coloring material adsorbed or bonded in a monomolecular state on the surface thereof, and an aggregate of the coloring material.

BRIEF DESCRIPTION OF THE DRAWINGS

FIGS. 15A, 15B, 15C, 15D, and 15E show schematically a process for formation of a colored portion of an ink-jet recorded image according to the present invention.

FIG. 17A shows lifting of an ink blade; FIG. 17B shows wiping of a print head; FIG. 17C shows lowering of an ink blade; FIG. 17D shows lifting of the both blades after a liquid composition is set at a prescribed position; FIG. 17E shows wiping of the head for the liquid composition and of the head for a second black ink head; and FIGS. 17F shows lowering of the both blades.

DETAILED DESCRIPTION OF THE PREFERRED EMBODIMENTS

The present invention is described below in more detail by reference to preferred embodiments.

The ink set of an embodiment of the present invention comprises separately an aqueous anionic or cationic ink containing a colorant, and a liquid composition containing fine particles charged on the surface in polarity opposite to that of the aqueous ink and being in a dispersion state, the ink set being characterized in that the aqueous ink and the liquid composition are adjusted to give, on mixing in a ratio of 1:1 by weight, a pH which causes aggregation of at least the colorant.

According to the above constitution of the present invention, an ink-jet recorded image can be formed with a broad color reproduction range, uniformity of the colors, effective prevention of bleeding at the boundary between different color areas, and high abrasion resistance of the record.

The aqueous ink and the liquid composition, which have a very simple constitution, have high shelf stability, and enables stable formation of ink-jet recorded image with high image quality advantageously The superior technical effects as mentioned above are presumably achieved by the reasons below.

The image formation according to the present invention is explained below by reference to FIG. 14.

For the explanation, the terms herein used are defined. In the present invention, the "monomolecular state" means a state of the colorant, a dye or a pigment, almost dissolved or dispersed in the ink. The state containing a slight aggregation of the coloring material is included in the "monomolecular state" in the present invention as long as the chroma does not lower. Since the dye is preferably in a monomolecular state, the dissolved or dispersed state of the colorants other than the dye is called "monomolecular state".

Figure 14:
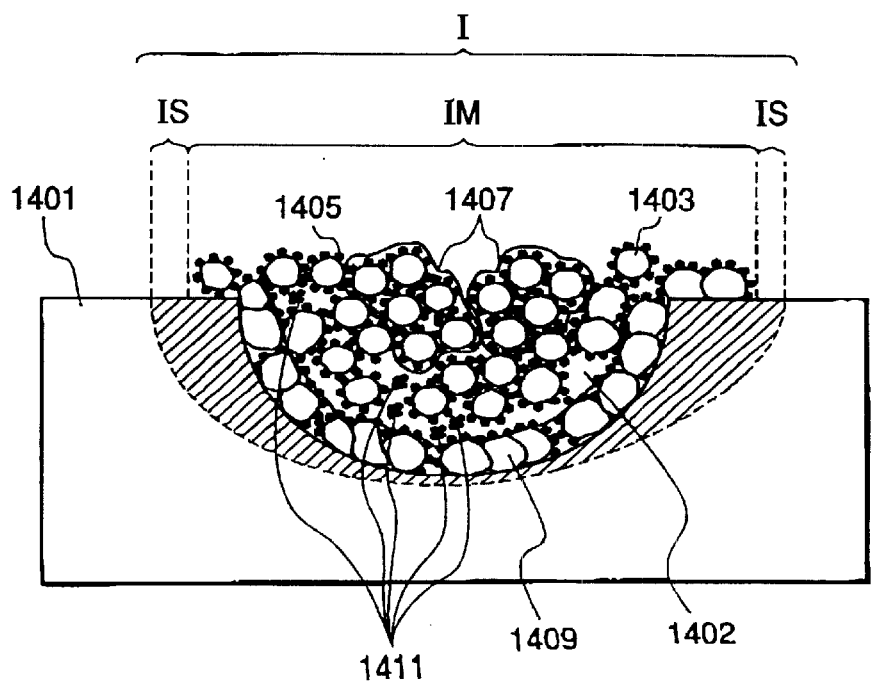
FIG. 14 is a schematic sectional view for explaining the state of a colored portion of an ink-jet image of the present invention.

FIG. 14 shows schematically a state of the colored part I of a recorded image of the present invention constituted of a main image portion IM and a surrounding portion IS. In FIG. 14, the numeral 1401 denotes a recording medium; 1402, an interstice between fibers of the recording medium; 1403, a fine particle capable of adsorbing chemically a coloring material 1405.

As shown in FIG. 14, in the ink-jet recorded image in the present invention, the main image portion IM is constituted of fine particles 1403 having a coloring material 1405 adsorbed uniformly in a monomolecular or nearly monomolecular state (hereinafter simply referred to as "monomolecular state") on the surface thereof and aggregates 1407 of the fine particles having the coloring material adsorbed in a monomolecular state. The numeral 1409 denotes an aggregate of the fine particles near the recording medium fiber in the main image portion IM. The main image portion IM is formed through two steps: physical or chemical adsorption of fine particles 1403 on the recording medium fibers, and adsorption of the coloring material 1405 on the fine particles 1403 in a liquid-liquid state. Therefore, the developability of the coloring material itself is little impaired, and even on a recording medium like a plain paper sheet which is readily permeable to the ink, an image can be formed with a high density and a high chrome and with a wide range of color reproduction comparable to that of coated paper.

According to the knowledge of the inventors, in the course of recording using the aqueous ink and the liquid composition at a ratio of about 1:1 by weight (overstriking of one dot on one dot) on a recording medium, the ratio of the coloring material adsorbed on the fine particles is in the range as low as from about 30% to about 50% by weight of the entire colorant. The unadsorbed colorant, 50% to 70% by weight of the entire colorant, is not affected by the fine particles in the liquid composition, contributing to the formation of the colored part by means of dispersion, penetration, or dispersion-and-penetration.

The inventors have confirmed that the color reproduction range comparable to that on the coated paper can be achieved by the coloring material adsorbed on the surface of the fine particles even if the amount of the adsorbed coloring material is half or less than the entire coloring material, and that the coloring material not having reacted with the fine particles forms fine bleeding around the picture element to produce a very significant effect of preventing streaky irregularity.

Thus, the portion of the coloring material 1405 not adsorbed on the surface of the fine particles 1403 and remaining in the ink will penetrate in a lateral direction as well as In a depth direction in the recording medium 1401, thereby forming fine bleeding of the ink in the surrounding portion IS. The coloring material remaining in the vicinity of the surface of the recording medium 1401 and the fine bleeding of the ink formed in the surrounding portion will decrease white haze and color irregularity to improve color uniformity even in the image area like a shadow portion or a solid print portion where a large amount of ink is applied.

On the other hand, the inventors have found that, in formation of a recorded matter in which different colors are adjacently applied, the ink feathering caused by the coloring material not having reacted with the fine particles is more precisely controlled preferably in order to prevent bleeding. When the aqueous ink and the liquid composition are applied to a recording medium so that they can be brought into contact with each other in a liquid state, control of pH of the liquid mixture of the aqueous ink and the liquid composition, which is formed by mixing on the recording medium, is found to produce considerable effect in controlling the fine feathering, or the bleeding. The behavior of the coloring material 1405 not having reacted with the fine particles can be controlled in the liquid mixture by controlling the pH of the liquid mixture of the aqueous ink and the liquid composition to be lower than the aggregation-initiating pH at which the coloring material (dye) starts to aggregate. The above is presumably one of the reasons for the aforementioned effects. More specifically, the portion of the coloring material 1405 in the ink applied onto the recording medium and not having reacted with the fine particles 1403 can form an aggregate 1411 by change of the properties, such as the pH, of the solvent upon mixing of the ink and the liquid composition. This coloring material aggregate itself is not desirable for color development as mentioned before. However, in this embodiment, the presence of the aggregate does not impair the color development so much. Presumably, the reasons are that the aggregates of the coloring material exist in the interstices between the fine particles containing the adsorbed or bonded coloring material in a monomolecular state, and that the aggregates of the coloring material are formed below the colored portion constituting the image owing to the more rapid rate of the aggregation than the adsorption or bonding of the coloring material in a monomolecular state onto the fine particle surface.

FIGS. 15A to 15E show schematically a rough sectional view of a colored portion 1500 and a process for formation thereof in an embodiment of image formation in the ink-jet recording method of the present invention. In FIGS. 15A to 15E, the numeral 1501 denotes the region containing the main portion of a reaction product of the ink and the liquid composition, e.g., a product of the reaction of the coloring material and the fine particles (hereinafter referred to as "a reaction region"). This region corresponds to the main image part IM in FIG. 14. The numeral 1502 denotes the part formed by flow-out of the ink not having reacted with the liquid composition in the periphery of the reaction region 1501 (hereinafter referred to as "ink flow-out region"), corresponding to the surrounding part IS in FIG. 14. The colored part 1500 is formed, for example, as below. The numeral 1505 in FIG. 15A denotes interstices or air gaps between fibers of the recording medium illustrated schematically.

Firstly, a liquid composition 1506 reactive to a coloring material 1504 is applied in a form of a liquid droplet to a recording medium 1503 (FIG. 15A) As a result, a liquid pool 1507 of the liquid composition is formed (FIG. 15B). Within the liquid pool 1507, fine particles 1509 near the surface of the fiber of the recording medium are adsorbed physically or chemically on the surface of the fiber In this step, some of the particles may become instable in the dispersion to form aggregates 1511. On the other hand, the fine particles 1509 far from the fiber in the liquid pool 1507 may keep the original dispersion state thereof.

Then, an ink 1513 is applied in a form of a liquid droplet onto the recording medium 1503 (FIG. 15B). As a result, the coloring material 1504 is adsorbed chemically on the fine particles 1509 at the interface between the ink 1513 and the liquid pool 1507. Since the adsorption reaction proceeds between the liquids (by liquid-liquid reaction), the coloring material 1504 is adsorbed uniformly in a monomolecular state on the surface of the fine particles 1509 (FIG. 15D). That is, the coloring material does not aggregate at all or little aggregates on the surface of the fine particles. Consequently, many particles are formed which have coloring material 1504 adsorbed thereon in a monomolecular state, in the surface layer portion of the reaction region 1501 to make the coloring material remain in a monomolecular state on the surface layer affecting greatly the color development, thereby giving a recorded image in a high image density with a high chroma. On the other hand, a part of the coloring material 1504 not having reacted with the fine particles forms aggregates 1517 of the coloring material owing to a change of the properties of the liquid medium, such as pH change, caused by mixing of the ink and the liquid composition, and precipitates in the liquid mixture on the recording medium.

The fine particles having the coloring material 1504 adsorbed thereon become unstable in the dispersion state to cause aggregation between the fine particles (FIG. 15D). The formed aggregate 1515 retains the coloring material in a monomolecular state also in the interior thereof. This aggregate 1515 forms a recorded image at a high image density with high chroma. Another part of the unreacted coloring material 1504 diffuses in the liquid pool 1507 to be adsorbed on an unreacted surface of the fine particle 1509. The further progress of the reaction inside the liquid pool 1507 enables image formation at a higher density with high chroma. The aforementioned aggregates 1511 of the fine particles formed on the surface of the fiber of the recording medium would serve to impede penetration of the liquid phase into the recording medium interior. Hence, in the liquid pool 1507, more fine particles 1509 and more coloring material 1504 can exist in the liquid composition which is thus made less penetrative, whereby the contact probability of the coloring material 1504 with the fine particles 1509 is enhanced, allowing the reaction to proceed relatively uniformly and sufficiently, thereby giving a more uniform image with a high image density and high chroma.

When the liquid composition 1506 is applied to the recording medium 1503 (FIG. 15A), or when the ink 1513 is applied to the liquid pool 1507 (FIG. 15B), the dispersion medium for the dispersed fine particles 1509 can become changed in the properties to instabilize the dispersion of the fine particles 1509, causing aggregation of some of the fine particles 1509 before adsorption of the coloring material 1504. Here the change of the dispersion medium signifies a change of properties generally observed upon mixing of two or more different kinds of liquids: the physical properties such as pH of the liquid phase, a solid content, a solvent composition, and a dissolved ion concentration. Upon contact of the liquid composition with the recording medium or the ink, the changes can arise quickly and concurrently to destroy the dispersion stability of the fine particles to cause aggregation of the particles.

The aggregate is estimated to serve to fill the interstices, or to keep the fine particles adsorbing the coloring material thereon near the surface of the recording medium. Some of the aggregates formed inside the liquid pool 1507 are adsorbed to the recording medium, whereas some of them are mobile (flowable) in the liquid phase. The flowable aggregates, similarly to in the reaction process of the coloring material with the fine particles, adsorb the coloring material in a monomolecular state on the surface of the fine particle aggregate to form a larger aggregate, which contributes to improvement in the color developability. This larger aggregate may move with the liquid phase penetrating along the fiber to fill the interstice to make smooth the surface of the recording medium, which contributes to the formation of images with uniform and high density.

High-color images can be formed according to the invention as described later. This may be caused by adsorption of the coloring material in a monomolecular state on the fine particles or their aggregates remaining on or near the surface of the recording medium. The fine particles having adsorbed the coloring material remain on the surface of the recording medium and are fixed thereto, thereby improving the fastness of the image.

The aqueous ink and the liquid composition are adjusted according to the present invention so that the coloring material begins to aggregate when the aqueous ink and the liquid composition are brought into contact with each other in a liquid-liquid state on the recording medium to form a liquid mixture. Thereby, a part of the coloring material forms a coloring material aggregate 1517 which effectively prevents Irregular penetration of unreacted coloring material into the recording medium.

Figure 10:
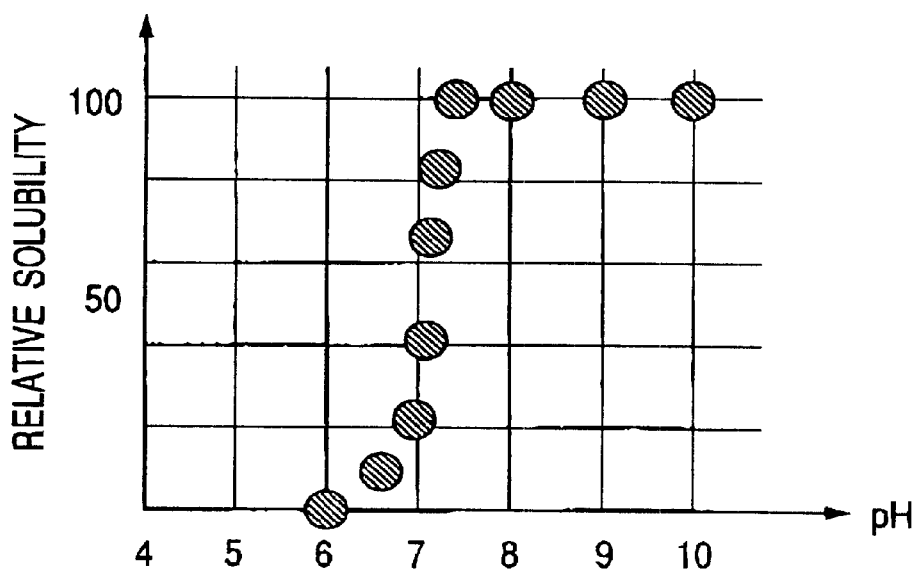
FIGS. 10 shows the dependency of the solubility of an ink dye on the pH of the solution.

The dependence of the solubility of the dye on the pH of the solution is explained below. FIG. 10 is a graph for explaining a relative solubility of the dye on the pH of the solution. In this experiment, a black dye, Direct Black 195 was used as the dye, and the dye solution in water was acidified by addition of nitric acid and stirred for 10 minutes to adjust the pH. As the dye solution is made acidic gradually from pH 10, the dye comes to be deposited at about pH 7.5 (aggregation initiation pH) as shown in FIG. 10. As the pH is further lowered, the dye becomes insoluble at about pH 6.5.

Thus, the desired dye molecules can be insolubilized at a desired rate by adjusting the liquid composition and the ink to provide a liquid mixture having a Ph lower than the aggregation initiation pH at which the dye begins to aggregate in the ink when the liquid composition and the ink are mixed on the recording medium. The dye molecules not adsorbed to the fine particles in the liquid composition can suitably be restricted, restrained and controlled by the pH adjustment. The adjustment of the pH of the liquid mixture of the liquid composition and the ink enables retardation of the bleeding between the different colors as well as a broad range of color reproduction.

On or near the surface of the recording medium, the fine particles and dye remain. This reduces white haze and color irregularity even in a shadow portion, a solid print portion, or other portion of the image where a larger amount of the ink is applied.

As to the fixation of the image, incorporation of a penetrating agent such as the aforementioned surfactant into the ink is effective so as to improve the ink penetration properties. In this case, the dye molecules in the ink can be suitably adsorbed and aggregated, and the image can be fixed at a high speed without disadvantages such as decrease in the image density, decrease in the edge sharpness of image, decrease in the resolution, even with incorporation of the penetrating agent into the ink.

In formation of a colored area on a recording medium according to the present invention, since the liquid composition and the ink are applied to the recording medium in such a way that they are brought into contact with each other in a liquid state on the recording medium, the cationic fine particles and the coloring material are caused to react in a liquid phase on the recording medium surface to cause adsorption of the coloring material onto the fine particles effectively.

On the other hand, as for an ink-jet printing coated paper sheet, a larger amount of cationic porous fine particles are necessary for achieving the adsorption of coloring material to the same extent as in the present invention, and a thick ink-receiving layer must be formed to cover completely the base paper sheet, which necessarily impairs the feel of the base paper of the coated paper. In the present invention, however, since the amount of the fine particles used in the liquid composition can be made smaller, images can be formed without impairing the feel of the recording medium and without incongruity between the printed and unprinted areas.

The aqueous ink and the liquid composition characteristic of the present invention are described below in detail. Firstly, the cationic ink or the anionic ink is defined below In referring to the ionic property, the ink Itself is not electrostatically charged and is neutral, which is well known in the art. The anionic ink or the cationic ink herein means an ink which contains a component, for example a coloring material, having an anionic group or a cationic group and which is adjusted so that the group may behave as the anionic group or the cationic group in the ink.

Liquid Composition

The liquid composition in the present invention is characterized by the surface electrostatically charged in the charge polarity opposite to that of the ink used in combination. A cationic liquid composition or an anionic liquid composition is then used depending on the charge polarity of the ink.

Cationic Liquid Composition

The cationic liquid composition contains, for example, inorganic fine particles having a cationic group on the surface and an acid, the inorganic fine particles being stably dispersed therein Preferably, the cationic liquid composition in the present invention, for example, contains an acid, and has a pH as adjusted in the range of 2 to 7, or has a zeta potential in the range from +5 to +90 mV.

pH and Zeta Potential

The zeta potential of the liquid composition is explained below together with the fundamental principle thereof. Generally, in a system wherein a solid is dispersed in a liquid, the solid phase having a free charge on the surface, a layer of charge with the opposite polarity is formed in the liquid phase in the vicinity of the interface of the solid phase in such a manner that the system is kept electrically neutral. The pair of the layers is called electrical double layers, and the potential difference between the electrical double layers is called a zeta potential When the zeta potential is positive, the surface of the fine particles is cationic, whereas when it is negative, the surface is anionic. Generally, at a higher absolute value of the zeta potential, the electrostatic repulsion force acting between the fine particles is stronger, giving higher dispersibility and stronger ionic properties of the fine particle surface. That is, the higher the zeta potential of cationic fine particles is, the stronger the cationic properties is, and the stronger the force to attract an anionic compound in the ink is.

After comprehensive investigation, the inventors have found that use of the liquid composition having a zeta potential ranging from +5 to +90 mV enables formation of a colored area with excellent coloring property on a recording medium. This is probably due to a suitable cationic property of the fine particles which retards quick aggregation of the anionic compound to allow thin and uniform adsorption of the anionic compound on the fine particle surface, retarding formation of large lake particles of the coloring material, and thereby bringing about the inherent coloring property of the coloring material in a better state. In the cationic liquid composition employed in the present invention, after the anionic compound is adsorbed on the fine particle surface, presumably the fine particles become unstable in the dispersion while keeping a weakly cationic property to facilitate adsorption of the fine particles on the surface of an anionic cellulose fibers or the like in the recording medium, and the fine particles tend to remain on or near the surface of the recording medium.

Consequently, according to the present invention, the effects below are obtained. That is, the coloring property can be obtained which is comparable to that of ink jet coated paper. An image can be obtained with less white haze and color unevenness and with excellent uniformity of color in the image area like a shadow portion or a solid print portion where a larger amount of ink is applied. The anionic compound is adsorbed efficiently to the fine particles to develop a color in comparison with the coated paper, so that the amount of the cationic fine particles can be decreased. As a result, particularly when printing is conducted using plain paper, good images can be obtained without impairing the feel of the paper and with high abrasion resistance. The zeta potential of the liquid composition is more preferably in the range from +10 to +85 mV. In this range, any border between the dots are hardly noticeable in a solid print, and an excellent image can be formed without streaky irregularity in head-scanning. In the range from +15 to +65 mV, an image with excellent coloring properties can be formed irrespectively of the kind of paper used.

The pH of the cationic liquid composition used in the present invention ranges preferably from 2 to 7 at about 25° C. in view of the storage stability thereof and adsorption of the anionic compound. Within this pH range, the stability of the anionic compound is not significantly lowered by mixing with the anionic ink, not causing strong aggregation of the anionic compound, and preventing effectively drop of chroma of the recorded image or dulling of the image. Further within the above-mentioned pH range, the cationic fine particles can be dispersed well, and the stability in storage and in ejection through a recording head of the liquid composition are maintained satisfactorily. The anionic substance is adsorbed sufficiently on the cationic fine particle surface when the liquid composition is mixed with an ink to prevent excessive penetration of the coloring material into the recording medium, producing an ink-jet record with excellent color development. The pH is more preferably in the range from 3 to 6. Within this range, corrosion of the recording head is effectively prevented for a long term of storage, and the abrasion resistance of the print is further improved.

Cationic Fine Particles

The cationic fine particles employed in the present invention is preferably cationic at the surface of the particles in a state of dispersion in the liquid composition for achieving the aforementioned effects. The cationic surface quickly adsorbs the anionic coloring material on mixing with the anionic ink and retards excessive penetration of the coloring material, into the recording medium to produce an ink-jet record with sufficient image density. In contrast, when the surface of the fine particles is not cationic and the fine particles are present independently of a water-soluble cationic compound in the liquid composition, the cationic compound causes the aggregation of the coloring material to impair the coloring property of the coloring material itself and good color development cannot be achieved which is comparable with the image formed on an ink-jet recording coated paper.

The fine particle material in the liquid composition used in the present invention should preferably have a cationic surface, and of course, inherently cationic fine particles can be used, and inherently electrostatically anionic or neutral fine particles can be even used as long as the surface thereof is cationized by surface treatment The material of the cationic fine particles suitable for use in the present invention is not specially limited, and includes inorganic fine particulate matters, organic fine particulate matters, and inorganic-organic fine particulate composite matters Specifically the inorganic particulate matters include cationized particulate matters of silica, alumina, alumina hydrate, titania, zirconia, boria, silica-boria, ceria, magnesia, silica-magnesia, calcium carbonate, magnesium carbonate, zinc oxide, and hydrotalsite. The organic particulate matters include cationic emulsions or latexes of conjugate diene copolymers and vinyl copolymers such as styrene-acrylic copolymers, acrylate ester copolymers, methacrylate ester copolymers, SBR latexes, and ethylene-vinyl acetate copolymers; and cation-modified products of melamine beads and plastic pigments. The inorganic-organic fine particulate composite matters include fine particulate matters of inorganic particles having primary, secondary, or tertiary amine salt type functional group on the surface.

The above cationic fine particles used in the present invention preferably have an average particle diameter ranging from 0.005 to 1 μm as measured by dynamic light scattering system in view of color development and color uniformity after printing, and shelf stability. Within this range, the excessive penetration of the fine particles into the recording medium can be effectively prevented without drop of the color developability and color uniformity. Further, sedimentation of the cationic fine particles in the liquid composition can be controlled, and reduction of the shelf stability of the liquid composition can be effectively prevented More preferably the average particle diameter is in the range from 0.01 to 0.8 μm. By use of such fine particles, the image printed on a recording medium becomes especially excellent in rub-off resistance and feel or texture of the record.

The content of the aforementioned cationic fine particles in the liquid composition in the present invention may be decided in a suitable range depending on the kind of the material to be used. The range is preferably from 0.1% to 40% more preferably from 1% to 30%, still more preferably from 3% to 15% by weight in view of effectively achieving the object of the present invention. Within this range, images can be formed steadily with excellent color independently of the kind of paper used, and the shelf stability and the ejection stability of the liquid composition are particularly excellent Acid Preferably, the liquid composition used in the present invention contains an acid and is controlled to have a pH adjusted in the range from 2 to 7, as described above. The acid as a second component ionizes the surface of the cationic fine particle surface and raises the surface potential, serving to improve the dispersion stability of the fine particles in the liquid and the ability of the fine particles for adsorbing the anionic compound in the ink, and to adjust the viscosity of the liquid composition The acid suitable in the present invention is not specially limited, provided that the acid in combination with the cationic fine particles gives desired properties such as the pH, the zeta potential, and the fine particle dispersibility.

The acid includes specifically inorganic acids such as hydrochloric acid, sulfuric acid, sulfurous acid, nitric acid, nitrous acid, phosphoric acid, boric acid, and carbonic acid; organic acids such as carboxylic acids, sulfonic acids, and amino acids mentioned below. The carboxylic acids includes formic acid, acetic acid, chloroacetic acid, dichloroacetic acid, trichloroacetic acid, fluoroacetic acid, trimethylacetic acid, methoxyacetic acid, mercaptoacetic acid, glycolic acid, propionic acid, butyric acid, valeric acid, caproic acid, caprylic acid, capric acid, lauric acid, myristic acid, palmitic acid, stearic acid, oleaic acid, linoleic acid, linolenic acid, cyclohexane-carboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid,,salicylic acid, p-hydroxybenzoic acid, anthranilic acid, m-aminobenzoic acid, p-aminobenzoic acid, o-methoxybenzoic acid, m-methoxybenzoic acid, and p-methoxybenzoic acid. The sulfonic acid includes benzenesulfonic acid, methylbenzenesulfonic acid, ethylbenzenesulfonic acid, dodecylbenzenesulfonic acid, 2,4,6-trimethylbenzenesulfonic acid, 2,4-dimethylbenzenesulfonic acid, 5-sulfosalicylic acid, 1-sulfonaphthalene, 2-sulfonaphthalene, hexanesulfonic acid, octanesulfonic acid, and dodecanesulfonic acid. The amino acid includes glycine, alanine, valine, α-aminobutyric acid, γ-aminobutyric acid, β-alanine, taurine, serine, ε-amino-n-caproic acid, leucine, norleucine, and phenylalanine.

One or more acids may be used combinedly in the liquid composition in the present invention. Of the acids, the one which has a primary dissociation constant pKa of not higher than 5 in water is preferred because of its excellent ability of stabilization of cationic fine particle dispersion and excellent adsorption ability of adsorbing the cationic fine particles. Specifically the suitable acid includes hydrochloric acid, nitric acid, sulfuric acid, phosphoric acid, acetic acid, formic acid, oxalic acid, lactic acid, citric acid, maleic acid, and malonic acid.

In the liquid composition, the mixing ratio of the cationic fine particles to the acid ranges preferably from 200:1 to 5:1, more preferably from 150:1 to 8:1 by weight for improvement of the dispersion stability of the cationic fine particles and improvement of adsorption ability of the anionic compound to the fine particle surface.

Other Constituents

The other constituents of the cationic liquid composition are specifically explained below. The cationic liquid composition used in the present invention contains the aforementioned cationic fine particles as the essential component and may preferably contain the above mentioned acid and usually water as the liquid medium. The liquid composition may further contain a water-soluble organic solvent and an additive. The water-soluble organic solvent includes amides such as dimethylformamide, and dimethylacetamide; ketones such as acetone; ethers such as tetrahydrofuran, and dioxane; polyalkylene glycols such as polyethylene glycol, and polypropylene glycol; alkylene glycols such as ethylene glycol, propylene glycol, butylene glycol, triethylene glycol, 1,2,6-hexanetriol, thiodiglycol, hexylene glycol, and diethylene glycol; lower alkyl ethers of polyhydric alcohols such as ethylene glycol methyl ether, diethylene glycol monomethyl ether, and triethylene glycol monomethyl ether; primary alcohols such as ethanol, isopropyl alcohol, n-butyl alcohol, and isobutyl alcohol; glycerol; N-methyl-2-pyrrolidone; 1,3-dimethyl-imidazolidinone: triethanolamine; sulfolane; and dimethylsulfoxide. The content of the above water-soluble solvent is, for example, in the range from 5% to 60% by weight, preferably from 5% to 40% by weight based on the total weight of the liquid composition, but is not limited thereto.

The liquid composition may further contain an additive such as a viscosity controller, a pH controller, an antiseptic, a surfactant, an antioxidant, an evaporation promotor, a water-soluble cationic compound, and a binder resin, if necessary. The selection of the surfactant is particularly important in controlling the penetrativity of the liquid composition into the recording medium. The water-soluble cationic compound may be added arbitrarily for the purpose of imparting further the cationic property to the liquid composition in a suitable amount provided that the addition does not reduce the effects of the present invention.

The water-soluble cationic compound specifically includes polyallylamine, polyamine sulfone, polyvinylamine, chitosan, and those neutralized or partially neutralized by an acid such as hydrochloric acid and acetic acid; partially cationized polymeric nonionic compounds such as copolymer of vinylpyrrolidone and a quaternary salt of aminoalkylalkylate, and copolymers of acrylamide and a quaternary salt of an aminomethylacrylamide; primary, secondary, or tertiary amine salt type compounds; and amino acid type amphoteric compounds. The compound may be used solely or in combination of two or more thereof. The binder resin nay be used additionally for the purpose of further improvement of rub-off resistance of the cationic fine particles to such an extent that the feel of the recording medium, and the shelf stability and ejection stability of the liquid composition are not impaired. The binder resin may be selected and used from water-soluble polymers, emulsions, and latexes, or the like.

Surface Tension of Liquid Composition

The liquid composition used in the present invention is preferably colorless or white However, the composition may be color-conformed to the color of the recording medium The liquid composition may have a surface tension ranging preferably from 10 to 60 mN/m (dyn/cm), more preferably from 10 to 40 mN/rn (dyn/cm), and a viscosity ranging from 1 to 30 mPa·s (CP).

Coloring Material Aggregating Function of Cationic Liquid Composition

The cationic liquid composition used in the present invention may preferably have a pH not lower than 2 at about 25° C. in view of the shelf stability and adsorption of the anionic compound. At the pH of not lower than 2, the stability of the anionic compound in the ink is not significantly impaired upon mixing with the ink, so that excessively firm aggregation of the anionic compound can be avoided before the adsorption thereof in a monomolecular state by the fine particles in the liquid composition. There is no upper limit of the pH. Aggregation of unadsorbed coloring material molecules is effective for preventing feathering of the image or bleeding of the coloring material which is caused by penetration or diffusion of the coloring material molecules not adsorbed to the fine particles on or in the recording medium. Therefore, in the present invention, the liquid composition and the aqueous ink are controlled or adjusted so as to give, when mixed on the recording medium, a pH preferably not lower than 2 to avoid rapid aggregation of the coloring material, and not higher than the aggregation initiation pH of the coloring material. Thereby, even in the recording on plain paper, the bleeding can be retarded and at the same time the color can be reproduced to the same extent as on an ink-jet recording coated paper. By controlling the pH of the liquid compositions deterioration of dispersibility of the cationic fine particles can be retarded, and the liquid composition is improved in shelf stability and ejection stability through a recording head.

A specific example of combination of the anionic ink and the cationic liquid composition is shown below which causes the PH change to cause aggregation of the anionic coloring material in the anionic ink on mixing the anionic ink with the cationic liquid composition

| (Anionic ink: pH = 9.8) | |
|---|---|
| Direct Black 195 | 2.5 parts |
| 2-Pyrrolidone | 10 parts |
| Glycerol | 5 parts |
| Isopropyl alcohol | 4 parts |
| NaOH | 0.4 parts |
| Water     Balance | (100 parts in total) |

| (Cationic liquid composition: pH = 3.5) | |
|---|---|
| Glycerol | 7.5 parts |
| Diethylene glycol | 7.5 parts |
| Alumina hydrate | 10 parts |
| Acetic acid | 3 parts |
| Water     Balance | (100 parts in total) |

On mixing the above anionic ink and the cationic ink at a mixing ratio of 1:1 by weight, the pH of the liquid mixture changes near to the pH range 6.5 to 7.5 where Direct Black 195 begins to be insolubilized as shown in FIG. 10. Thereby, the Direct Black 195 is adsorbed on or bonded to the alumina hydrate surface in a monomolecular state, and the Direct Black 195 comes to aggregate moderately.

Anionic Liquid Composition

The anionic liquid composition used in the present invention is characterized in that it contains fine particles having an anionic group on the surface as the essential component, and the fine particles are dispersed stably therein. Preferably, the anionic composition contains a base, having a pH in the range of 7 to 12, having a zeta potential in the range from −5 to −90 mV.

pH and Zeta Potential

After comprehensive investigation, the inventors have found that the liquid composition having a zeta potential ranging from −5 to −90 mV allows effective adsorption of the cationic compound in the ink on the surface of the anionic fine particles to give excellent coloring property on a recording medium. This is probably due to a suitable anionic property of the fine particles which retards quick aggregation of the cationic compound in the ink to allow thin and uniform adsorption thereof on the fine particle surface, retarding formation of large lake particles of the coloring material, and thereby bring about the well-displayed state of coloring property inherent in the coloring material, similarly to the case of the aforementioned cationic liquid composition. In the anionic composition employed in the present invention, presumably the fine particles become unstable after adsorption of the cationic compound on the surface, tending to aggregate together due to a change in the concentration upon penetration of the solvent component into the recording medium and to remain on or near the surface of the recording medium. In the range from −15 to −65 mV, very excellent images can be formed, irrespective of the kind of paper used.

Consequently, according to the present invention, the effects below are obtained. An image can be obtained with excellent coloring property comparable to that on ink-jet printing coated paper, with less white haze and color unevenness and excellent color uniformity in the image region like a shadow portion or a solid print portion where a larger amount of ink is applied. The anionic compound is efficiently adsorbed to the fine particles to develop a color in comparison with the coated paper, and in consequence, the amount of the anionic fine particles can be decreased. Hence, especially when printing is conducted on plain paper, the feel or texture of the paper can be kept and the rub-off resistance in the printed area can be improved. The zeta potential of the liquid composition is more preferably in the range from −10 to −85 mV. In the liquid composition in this range, the anionic fine particles having the cationic compound adsorbed on the surface will spread properly on the recording medium, making less noticeable the border between dots in a solid print, so that an excellent image can be formed without streaky irregularity due to head-scanning.

The pH of the anionic liquid composition used in the present invention ranges preferably from 7 to 12 at about 25° C. in view of the shelf stability thereof and adsorption of the cationic compound. Within this pH range, the stability of the cationic compound is not significantly lowered upon mixing with the cationic ink, not causing firm aggregation of the anionic compound, and effectively preventing drop of chroma of the recorded image or dulling of the image. Further within the above-mentioned pH range, the cationic fine particles can be dispersed well, and the shelf stability and ejection stability through a recording head of the liquid composition can be maintained satisfactorily. The cationic substance is adsorbed sufficiently on the anionic fine particle surface on mixing with the ink to prevent excessive penetration of the coloring material into the recording medium, producing an ink-jet record with excellent color property. The pH is more preferably in the range from 8 to 11. Within this range, corrosion of the recording head for a long period of storage can effectively be prevented, and the rub-off resistance of the printed area is improved more.

Anionic Fine Particles

The anionic fine particles employed in the present invention is preferably anionic on the surface of the particles in a state of dispersion in the liquid composition for achieving the aforementioned effects. The anionic surface of the fine particles can adsorb the cationic coloring material on mixing with the cationic ink and suppress excessive penetration of the cationic coloring material into the recording medium to produce an ink-jet record with sufficient image density. In contrast, when the surface of the fine particles is not anionic and the fine particles are present separately from the water-soluble anionic compound in the liquid composition, the coloring material is caused to aggregate around the anionic compound to impair the coloring property of the coloring material, and as a result the color development cannot be achieved which is comparable with the image formed on an ink-jet recording coated paper.

The fine particle material in the liquid composition used in the present invention should preferably have an anionic surface, and of course, inherently anionic fine particles can be used, and inherently electrostatically cationic or neutral fine particles can be even used as long as the surface thereof is anionized by surface treatment.

The material of the anionic fine particles suitable for use in the present invention is not specially limited, and includes inorganic fine particulate matters, organic fine particulate matters, and inorganic-organic fine particulate composite matters. Specifically the inorganic particulate matters include anionized particulate matters of silica, titania, zirconia, boria, silica-boria, ceria, magnesia, silica-magnesia, calcium carbonate, magnesium carbonate, and zinc oxide. The organic particulate matters include anionic emulsions or latexes of conjugate diene copolymers and vinyl copolymers such as styrene-acrylic copolymers, acrylate ester copolymers, methacrylate ester copolymers, SBR latexes, and ethylene-vinyl acetate copolymers; and anion-modified products of melamine beads and plastic pigments. The inorganic-organic fine particulate composite matters include fine particulate matters of inorganic particles having a functional group exhibiting anionic properties in water.

The above anionic fine particles used in the present invention preferably have an average particle diameter ranging from 0.005 to 1 μm as measured by dynamic light scattering system in view of color development and color uniformity after printing, and shelf stability, similarly to the case of the aforementioned cationic fine particles. More preferably the average particle diameter is in the range from 0.01 to 0.8 μm. By use of such fine particles, the image printed on a recording medium is excellent especially in rub-off resistance and feel of the record.

The content of the aforementioned anionic fine particles in the liquid composition mentioned above may be decided in a suitable range depending on the kind of the material to be used. The range is preferably from 0.1% to 40% more preferably from 1% to 30% still more preferably from 3% to 15% by weight in view of effectively achieving the object of the present invention. Within this range, images can be formed steadily with excellent color development independently of the kind of paper used, and the shelf stability and the ejection stability of the liquid composition are particularly excellent.

Base

Preferably, the liquid composition used in the present invention contains a base and is controlled to have a pH adjusted in the range from 7 to 12, as described above. The base as a second component ionizes the surface of the anionic fine particle surface and raises the surface potential, serving to improve the dispersion stability of the fine particles in the liquid and the ability of the fine particles for adsorbing the cationic compound in the ink, and to adjust the viscosity of the liquid compositions The base suitable in the present invention is not specially limited, provided that the base in combination with the anionic fine particles gives desired properties such as the pH, the zeta potential, and the fine particle dispersibility.

The base includes specifically the inorganic and organic compounds below: sodium hydroxide, lithium hydroxide, sodium carbonate, ammonium carbonate, ammonia, sodium acetate, ammonium acetate, morpholine, monoethanolamine, diethanolamine, triethanolamine, ethylmonoethanolamine, n-butylmonoethanolamine, dimethylethanoline, diethylethanolamine, ethyldiethanolamine, n-butyldiethanolamine, di-n-butylethanolamine, monoisopropanolamine, diisopropanolamine, triusopropanolamine, and the like alkanolamines. Of these, the bases having a primary dissociation constant pKb of not higher than 5 in water are preferred since they improve the dispersion stability and adsorption of the cationic compound to the anionic fine particles.

In the liquid composition, the mixing ratio of the anionic fine particles to the base ranges preferably from 200:1 to 5:1, more preferably from 150:1 to 8:1 by weight for improvement of the dispersion stability of the anionic fine particles and improvement of adsorption ability of the anionic compound to the fine particle surface.

Other Constituents

The other constituents of the anionic liquid composition are specifically explained below. The anionic liquid composition used in the present invention contains the aforementioned anionic fine particles as the essential component and may preferably contain the above mentioned base, and usually water as the liquid medium. The liquid composition may further contain a water-soluble organic solvent, and an additive such as a viscosity controller, a pH controller, an antiseptic, a surfactant, an antioxidant, an evaporation promotor, a water-soluble anionic compound, and a binder resin, if necessary.

Surface Tension of Liquid Composition

The liquid composition used in the present invention is preferably colorless or white. However, the composition may be color-conformed to the color of the recording medium. The liquid composition may have a surface tension ranging preferably from 10 to 60 mN/m (dyn/cm), more preferably from 10 to 40 mN/m (dyn/cm), and a viscosity ranging from 1 to 30 mpa·s (cP).

Coloring Material Aggregating Function of Anionic Liquid Composition

The anionic liquid composition employed in the present invention performs two functions when it is mixed with the ink on a recording medium: adsorbing the dye molecules as the coloring material of the ink to the fine particles contained in the liquid composition with the aid of an appropriate adsorption power; and, when the liquid composition is mixed with the ink, lowering the pH of the liquid mixture to the coloring material aggregation initiation pH value or lower. For the functions, the fine particles contained in the liquid composition may preferably contain cationic fine particles and an acid at least on the surface thereof, and the liquid composition may preferably controlled to have a zeta potential adjusted in the range from +5 to +90 mV.

Aqueous Ink

Anionic Ink

The aqueous anionic ink is explained which constitutes an ink set in combination with the cationic liquid composition. The ink set herein means a combination of the liquid composition used in the present invention with at least one kind of anionic ink containing an anionic substance. A combination of one or more kinds of inks without the liquid composition of the present invention is called "ink subset". The anionic ink used in the present invention preferably contains a water-soluble dye having an anionic group as the coloring material, or preferably contains a pigment as the coloring material and an anionic compound. The above anionic ink may further contain water, a water-soluble organic solvent, and an additive such as a viscosity controller, a pH controller, an antiseptic, a surfactant, and an antioxidant, as necessary. The constituting components of the ink are explained below.

Water-soluble Dye the water-soluble dye having an anionic group used in the present invention may be selected from water-soluble acid dyes, direct dyes, and reactive dyes listed in Color Index without limitation. Any dyes having an anionic group such as a sulfo group, carboxylic group, or the like may be used even if they are not listed in the Color Index. The water-soluble dye may include also those which have a pH-depending solubility Pigment The aqueous ink of another type may contain a pigment and an anionic compound in place of the above-mentioned aqueous dye having an anionic group, and additionally water, and a water-soluble organic solvent, and an additive such as a viscosity controller, a pH controller, an antiseptic, a surfactant, and an antioxidant, as necessary. The anionic compound may be a dispersant for the pigment. In the case where the dispersant for the pigment is not anionic, an anionic compound may be added to the dispersant. Naturally, when an anionic dispersant is used, another anionic compound may be added.

The pigment useful in the present invention is not limited specially. The suitable pigments are shown below.

The carbon black used for the black pigment ink includes those produced by a furnace process, or a channel process having preferably the properties: primary particle diameter of 15 to 40 $\mu$m, BET specific surface area of 50 to 300 m$^2$/g, DBP absorptivity of 40 to 150 mL/100 g, volatile matter content of 0.5 to 10% and pH of 2 to 9. Commercially available products having such properties include No. 2300, No. 900, MCF88, No. 40, No. 52, MA7, MA8, and No. 2200B (produced by Mitsubishi Chemical Co.); RAVEN 1255 (Produced by Columbia Co.); REGAL 400R, REGAL 660R, and MOGUL L (produced by Cabot Co.); and Color Black FW1, Color Black FW18, Color Black S170, Color Black S150, Printex 35, and Printex U (produced by Degussa Co.). An experimental pigment prepared for use in the present invention is also useful.

The pigment for the yellow ink includes C.I. Pigment Yellow 1, C.I. Pigment Yellow 2, C.I. Pigment Yellow 3, C.I. Pigment Yellow 13, C.I. Pigment Yellow 16, and C.I. Pigment Yellow 83.

The pigment for the magenta ink includes C.I. Pigment Red 5, C-I. Pigment Red 7, C.I. Pigment Red 12, C.I. Pigment Red 48(Ca), C.I. Pigment Red 48(Mn), C.I. Pigment Red 57(Ca), C.I. Pigment Red 112, and C.I. Pigment Red 122.

The pigment for the cyan ink includes C.I. Pigment Blue 1, C.I. Pigment Blue 2, C.I. Pigment Blue 3, C-I. Pigment Blue 15.3, C-I. Pigment Blue 16, C.I. Pigment Blue 22, C.I. Vat Blue 4, and C.I. Vat Blue 6.

The coloring material of any of the colors may be an experimental product produced for use in the present invention.

Pigment Dispersant

The dispersant for the pigment of the ink of the present invention may be any water-soluble resin which has a function of dispersing stably the pigment in the presence of an anionic group in water or an aqueous medium. Its weight-average molecular weight is preferably in the range from 1,000 to 30,000, more preferably from 3,000 to 15,000. Specifically, the water-soluble resin includes block copolymers, graft copolymers, random copolymers, and salts thereof produced from two or more hydrophilic monomers and hydrophobic monomers: the hydrophobic monomers including styrene and its derivatives, vinylnaphthalene and Its derivatives, and aliphatic alcohol esters of $\alpha,\beta$-ethylenic unsaturated carboxylic acid; and the hydrophilic monomers including acrylic acid and its derivatives, maleic acid and its derivatives, itaconic acid and its derivatives, and fumaric acid and its derivatives. These resins are alkali-soluble polymers soluble in an aqueous solution containing a base dissolved therein.

Further, the dispersant may be a homopolymer or its salt produced from a hydrophilic monomer. Also useful are water-soluble resins such as polyvinyl alcohol, carboxymethylcellulose, and naphthalenesulfonic acid-formaldehyde condensates. Of these resins, alkali-soluble type resins are advantageous because of lower viscosity of the liquid dispersion and ease of dispersion. The water-soluble resin is preferably used in an amount ranging from 0.1% to 5% by weight based on the total weight of the ink.

The pigment ink useful in the present invention is produced by dispersing or dissolving the aforementioned pigment and the water-soluble resin in an aqueous medium. The suitable aqueous medium for the pigment type ink useful in the present invention is a mixed solvent composed of water and a water-soluble organic solvent. The water is preferably ion-exchanged water (deionized water), not usual water containing various ions.

If the dispersant is not an anionic polymer, an anionic compound is preferably added further to the ink containing the aforementioned pigment. The anionic compound preferably used in the present invention includes the alkali-soluble resins explained above as the pigment dispersant as well as low-molecular anionic surfactants shown below.

The low-molecular anionic surfactant includes specifically disodium lauryl sulfosuccinate, disodium polyoxyethylenelauroylethanolamido-sulfosuccinate, disodium polyoxyethylenealkyl sulfosuccinate, sodium salt of carboxylated polyoxyethylene lauryl ether, sodium salt of carboxylated polyoxyethylene tridecyl ether, sodium polyoxyethylene lauryl ether sulfate, triethanol amine polyoxyethylene lauryl ether sulfate, sodium polyoxyethylene alkyl ether sulfate, sodium alkylsulfate, and triethanolamine alkylsulf sodium polyoxyethylene alkyl ether sulfate,ate, but is not limited thereto.

The above anionic substance is used in an amount in the range preferably from 0.05% to 10%, more preferably from 0.05% to 5% by weight based on the total weight of the ink.

Self-dispersible Pigment

The pigment useful for the anionic ink includes self-dispersible type pigments which can be dispersed in water or an aqueous medium without a dispersant. The dispersible type pigment has, on the surface, at least one kind of hydrophilic group bonded thereto directly or through another linking atomic group. The anionic hydrophilic group includes the atomic groups shown below:

—COOM, —SO$_3$M, —SO$_2$NH$_2$, —PO$_3$HM, —PO$_3$M$_2$ (where M represents a hydrogen atom, alkali metal, ammonium, or organic ammonium).

The linking atomic group includes also alkyl groups of 1–12 carbon atoms, substituted or unsubstituted phenyl groups, and substituted or unsubstituted naphthyl groups.

The carbon black anionically charged by introduction of a hydrophilic group onto the surface thereof exhibits high water-dispersibility by repulsion of the ions, so that it keeps stable dispersion state in an aqueous ink without addition of a dispersant.

Additive to Ink

In addition to the above-mentioned components, there may be added a surfactant, a defoaming agent, an antiseptic, and the like to obtain the intended properties of the ink as necessary. A commercial water-soluble dye may further be added.

The surfactant Includes anionic surfactants such as fatty acid salts, higher alcohol sulfate ester salts, liquid fatty oil sulfate ester salts, and alkylallylsulfonate salts; and nonionic surfactants such as polyoxyethylene alkyl ethers, polyoxyethylene alkyl esters, polyoxyethylene sorbitan alkyl esters, acetylene alcohol, and acetylene glycol. One or more thereof may be suitably selected and used in an amount ranging from 0.01% to 5% by weight based on the total weight of the ink, depending on the amount of the dispersant added. The amount of the surfactant is preferably decided to obtain the surface tension of the ink not lower than 30 Mn/m (dyn/m) because in the ink-jet recording system printing distortion (deviation of ink droplet deposition points) or the like due to wetting of the nozzle tip can effectively prevented.

In preparation of the aforementioned pigment ink, a pigment is added to an aqueous solution containing at least a dispersing resin and water; the mixture is stirred and then dispersed by a dispersion means described later, and centrifuged if necessary to obtain an intended liquid dispersion; thereafter the aforementioned additive components are further added to the dispersion and the mixture is stirred to obtain the ink.

In the case where an alkali-soluble resin is employed, a base should be added to dissolve the resin. The amount of the amine or base to be added for the dissolution of the resin should be equal to or larger than the amount determined by calculation from the acid value of the resin. The amount of the amine or base is calculated by the equation below:

$$W = A \times M \times R / 5600$$

where W is the amount of the amine or base (grams), A is the acid value of the resin, M is the molecular weight of the amine or base, and R is the amount of the resin (grams).

In the above ink preparation, the aqueous solution containing the pigment before the dispersion treatment is preferably pre-mixed for 30 minutes or more, whereby the dispersion efficiency is improved. This premixing treatment improves the wettability of the surface of the pigment to promote adsorption of the dispersant on the pigment surface.

The base to be added to the dispersion containing an alkali-soluble type resin is selected preferably from organic bases such as monoethanolamine, diethanoamine, triethanolamine, amine methylpropanol, and organic ammonium; and inorganic amines such as potassium hydroxide, and sodium hydroxide.

The dispersing machine employed in preparation of the pigment may be any of conventional dispersing machines such as ball mills n sand mills. Of the dispersing machines, high-speed sand mills are preferred, such as Super Mill, Sand Grinder Mill, Beads Mill, Agitator Mill, Grain Mill, Dyno Mill, Pearl Mill, and Coball Mill (trade names).

The ink used in the present invention may contain in addition to the above components a further additive such as a water-soluble organic solvent, a surfactant, a Ph controller, a rust-preventive, a fungicide, an antioxidant, an evaporation promoter, a chelating agent, and a water-soluble polymer.

The liquid medium for dissolving or dispersing the above coloring material in the present invention is preferably a mixture of water with a water-soluble organic solvent. The water-soluble organic solvent includes specifically alkyl alcohols of 1–4 carbons such as methyl alcohol, ethyl alcohol, n-propyl alcohol, isopropyl alcohol, n-butyl alcohol, s-butyl alcohol, and t-butyl alcohol; amides such as dimethylformamide, and dimethyl acetamide; ketones such as acetone; ethers such as tetrahydrofuran, and dioxane; polyalkylene glycols such as polyethylene glycol, and polypropylene glycol; polyols having alkylene of 2–6 carbons such as ethylene glycol, propylene glycol, butylens glycol, triethylene glycol, 1,2,6-hexanetriol, thiodiglycol, hexylene glycol, and diethylene glycol; glycerin; lower alkyl ethers of a polyhydric alcohol such as ethylene glycol monomethyl (or monoethyl) ether, and diethylene glycol methyl (or ethyl) ether; cyclic amides such as N-methyl-2-pyrrolidone, and 1,3-dimethyl-2-imidazolidinone; sulfolane; dimethylsulfoxide; 2-pyrrolidone; $\epsilon$-caprolactam; and imide compounds such as succinimide.

The content of the water-soluble organic solvent is generally in the range from 1% to 40% preferably from 3% to 30% by weight based on the total weight of the ink The content of water in the ink is preferably in the range from 30% to 95% by weight, where the solubility of the coloring material is sufficient, the ink viscosity is kept low, and non-sticking property is satisfactory.

The anionic ink used in the present invention is useful for water-based writing tools, and is particularly suitable for use in an ink-jet recording system which ejects the ink by bubbling of the ink with the aid of thermal energy. In the ink-jet recording, the ink of the present invention is ejected highly stably without forming satellite dots. For use for the ink-jet recording, the thermal properties such as specific heat, thermal expansion coefficient, and thermal conductivity may be adjusted.

Cationic Ink

The aqueous cationic ink is explained which constitutes an ink set in combination with the anionic liquid composition. The ink set herein means a combination of the liquid composition used in the present invention with at least one kind of cationic ink containing a cationic substance. A combination of one or more kinds of inks without the liquid composition of the present invention is called "ink subset" The cationic ink used in the present invention preferably contains a water-soluble dye having a cationic group as the coloring material, or preferably-contains a pigment as the coloring material and a cationic compound. The above anionic ink may further contain water, a water-soluble organic solvent, and an additive such as a viscosity controller, a pH controller, an antiseptic, a surfactant, and an antioxidant, as necessary. The constituting components of the ink are explained below.

Water-soluble Dye

The water-soluble dye having a cationic group used in the present invention may be selected from water-soluble dyes listed in Color Index without limitation. Any dyes having a cationic group may be used even if they are not listed in the Color Index The water-soluble dye may include also those which have a pH-depending solubility.

Pigment

The aqueous ink of another type may contain a pigment and a cationic compound in place of the above-mentioned aqueous dye having a cationic group, and additionally water, and a water-soluble organic solvent, and an additive such as a viscosity controller, a pH controller, an antiseptic, a surfactant, and an antioxidant, as necessary The cationic compound may be a dispersant for the pigment. If the dispersant for the pigment is not cationic, a cationic compound may be added to the dispersant. Naturally, when a cationic dispersant is used, another cationic compound may be added. The pigment useful in this cationic ink is not limited, and the pigment as mentioned before for use for the anionic ink is useful also for the cationic ink.

Pigment Dispersant

The dispersant for the pigment of the ink of the present invention may be any water-soluble resin which has a function of dispersing stably the pigment in the presence of a cationic group in water or an aqueous medium. A specific example is a polymer which is produced by vinyl monomer polymerization and at least a portion of which polymer is cationic. The cationic monomer for constituting the cationic sites includes salts of the tertiary amine monomers below and quaternized products thereof, the monomer including: N,N-dimethylaminoethyl methaorylate $[CH_2=C(C_3)-COO-C_2H_4N(CH_3)_2]$, N,N-dimethylaminoethyl acrylate $[CH_2=CH-COO-C_2H_4N(CH_3)_2]$, N,N-dimethylaminopropyl methecrylate $[CH_2=C(CH_3)-COO-C_3H_6N(CH_3)_2]$, N,N-dimethylaminopropyl acrylate $[CH_2=CH-COO-C_3H_6N(CH_3)_2]$, N,N-dimethyl acrylamide $[CH_2=CH-CON(CH_3)_2]$, N,N-dimethyl methacrylamide $[CH_2=C(CH_3)-CON(CH_3)_2]$, N,N-dimethylaminoethyl acrylamidea $[CH_2=CH-CONHC_2H_4N(CH_3)_2]$, N,N-dimethylaminoethyl methacrylamide $[CH_2=C(CH_3)-CONHC_2H_4N(CH_3)_2]$, N,N-dimethylaminopropyl acrylamide $[CH_2=CH-CONHC_3H_6N(CH_3)_2]$, and N,N-dimethylaminopropyl methacrylamide $[CH_2=C(CH_3)-CONHC_3H_6N(CH_3)_2]$.

The tertiary amine is converted to its salt by using a salt-forming compound such as hydrochloric acid, sulfuric acid, acetic acid, and the like. The compound for quaternization includes methyl chloride, dimethyl sulfate, benzyl chloride, and epichlorohydrin. Of these, methyl chloride, dimethyl sulfate, and so forth are preferred in preparing the dispersant used in the present invention. The tertiary amine, or the quaternary amine behaves as a cation in water, and in the neutralized condition amine is dissolved stably in an acidic medium. The content of the above monomer in the copolymer is preferably in the range from 20% to 60% by weight.

The other monomer for constituting the polymeric dispersant includes hydroxy group-containing acrylate esters such as 2-hydroxyethyl methacrylate, and acrylate esters having a long ethylene oxide side chain, hydrophobic monomers such as styrene type monomers; and water-soluble monomers soluble in water at or near pH 7.0 such as acrylamides, vinyl ethers, vinylpyrrolidone, vinylpyridines, and vinyloxazolines. The hydrophobic monomer includes styrene and its derivatives, vinylnaphthalene and its derivatives, alkyl (meth)acrylates, and acrylonitrile. The polymeric dispersant prepared by copolymerization may contain the water-soluble monomer at a content ranging preferably from 15% to 35% by weight for stable dissolution of the copolymer in the aqueous solution, and the hydrophobia monomer at a content ranging preferably from 20% to 40% by weight for raising the effect of the copolymer on dispersing the pigment

Self-dispersible Pigment

The cationically charged carbon black has at least one of hydrophilic groups bonded directly or indirectly through a linking group The hydrophilic group includes the quaternary ammonium group shown below, but is not limited thereto in the present invention.

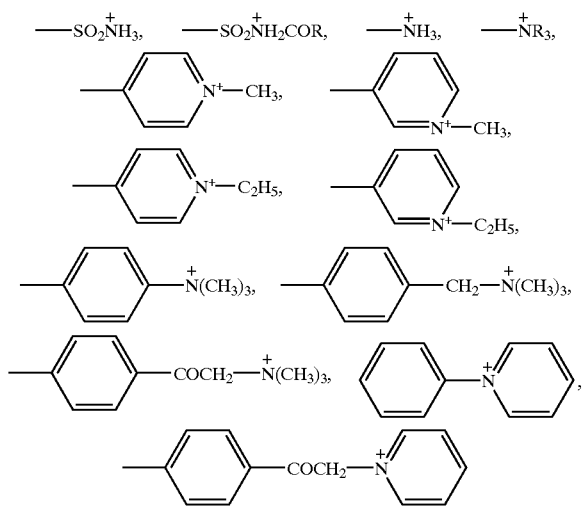

In the above formula, R represents linear or branched alkyl of 1–12 carbons, substituted or unsubstituted phenyl, or substituted or unsubstituted naphthyl. The cationic group has a counter-ion such as $NO_3^-$, and $CH_3COO^-$.

The cationically charged self-dispersible carbon black can be produced by bonding a hydrophilic group exemplified above For example, the N-ethylpyridyl group shown below is bonded to the carbon black by treating the carbon black with 3-amino-N-ethylpyridinium bromide.

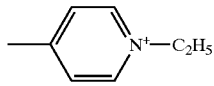

The carbon black, which is cationically charged by introduction of a hydrophilic group onto the surface, has high water-dispersibility owing to ionic repulsion, and keeps stable dispersion state in an aqueous ink without a dispersant.

Surface Tension and Viscosity of Ink

The surface tension of the cationic ink itself is preferably adjusted in the range from 30 to 68 mN/m (dyn/cm) at 25° C., and the viscosity of the cationic ink itself is preferably adjusted to be not higher than 15 mPa·s (cP), more preferably not higher than 10 mpa·s (cP), still more preferably not higher than 5 mpa·s (cP) at 25° C. the purpose of improving the penetration of the ink into the recording medium such as plain paper and the matching with an ink-jet head.

Concentration of Coloring Material in Ink

The concentration of the coloring material in the anionic ink or the cationic ink is selected depending on the kind of the colorant, an aqueous dye, a pigment, or a self-dispersible pigment, and is preferably in the range from 0.1% to 20%, more preferably from 0.1% to 12% by weight of the ink At the concentration ranging from 0.3% to 7% by weight and at the ratio of the concentrations of the coloring material in the ink to the fine particles in the liquid composition of not higher than 1.2, more preferably not higher than 1.0 by weight, the coloring property of the image is excellent in usual two-liquid recording.

Formation of Colored Area on Recording Medium

The method of formation of a colored area on a recording medium according to the present invention is described below. In the method of formation of a colored area of the present invention, an ink set having the aforementioned liquid composition and the aqueous ink is used The method comprises a step (i) of application of the aqueous ink onto a recording medium, and a step (ii) of application of the liquid composition onto the recording medium. The aqueous ink and the liquid composition are brought into contact with each other in a liquid state on the surface of the recording medium.

The method for application of the liquid composition and the aqueous ink constituted as mentioned above is explained below. In the formation of a colored area on a recording medium according to the present invention, the liquid composition is applied onto a colored area formation region on the recording medium or onto the colored area formation region and the vicinity thereof in such a way that the aqueous ink and the liquid composition are brought into contact with each other in a liquid-liquid state. Here, the colored area formation region signifies a region to which the ink dot is applied, and the vicinity thereof signifies a region within the range of about 1 to 5 dot size outside from the region where the ink dot is to be applied.

In the method of forming a colored area, the liquid composition and the ink may be applied in any manner, provided that the liquid composition and the ink are brought into contact with each other in a liquid state on a recording medium. Either of the liquid composition and the ink may be applied firstly onto the recording medium. For example, the step (ii) may be conducted firstly, and the step (i) later. Otherwise, the step (i) may be conducted firstly, and the step (ii) later. Further, the step (i) may be conducted firstly, the step (ii) secondly, and then the step (i) again. In the case where the liquid composition is applied firstly onto the recording medium, there is no specific limitation on the elapsed time between the application of the liquid composition and the subsequent application of the ink. To bring the liquid composition and the ink into contact with each other in a liquid state, however, the ink may preferably be applied to the recording medium substantially simultaneously with, or in several seconds of the application of the liquid composition.

Recording Medium

The recording medium to be used for the method of forming a colored area in the present invention is not limited. Conventional plain paper such as copying paper and bond paper may suitably be used. Naturally, also useful are coated paper specially produced for ink-jet recording and transparent films for OHP. Further, usual wood-free paper and glossy paper may be preferably used.

Method for Application of Liquid Composition

The liquid composition may be applied by a sprayer or a roller onto the entire face of the recording medium. However, the liquid composition is preferably applied by ink-jet system by which the liquid composition can be applied selectively and uniformly only to colored area formation regions where the ink is to be applied, or to the colored area formation region and the vicinity thereof. The various ink-jet recording systems can be employed. Of these, particularly suitable is the ink-jet recording system which ejects liquid droplets by action of bubbles generated by thermal energy.

Ink-jet Recording Apparatus

The ink-jet recording apparatus for the present invention is explained below. The ink-jet recording apparatus is equipped with an ink container storing a cationic or anionic aqueous ink containing a colorant, a first recording unit having an ink-jet head for ejecting the ink, a liquid composition container storing a liquid composition containing fine particles electrically charged in the polarity opposite to that of the aqueous ink in a dispersion state, and a second recording unit having an ink-jet head for ejecting the liquid composition. Another type of the ink-jet recording apparatus is equipped with an ink container storing a cationic or anionic aqueous ink containing a colorant, a liquid composition container storing a liquid composition containing fine particles electrically charged in the polarity opposite to that of the aqueous ink in a dispersion state, and a ink-jet head for ejecting the aqueous ink stored in the ink container and the liquid composition stored in the liquid composition container separately and independently. The ink-jet recording apparatus is explained below more specifically.

Figure 1:
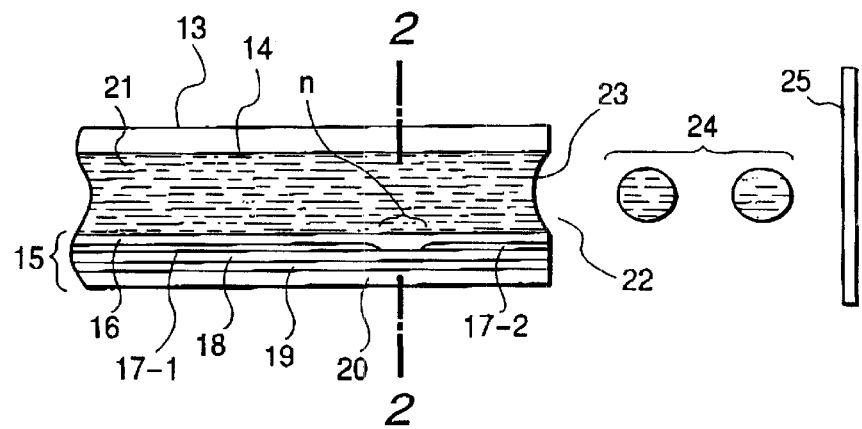
FIG. 1 is a vertical sectional view of a head of an ink-jet recording apparatus.
Figure 2:
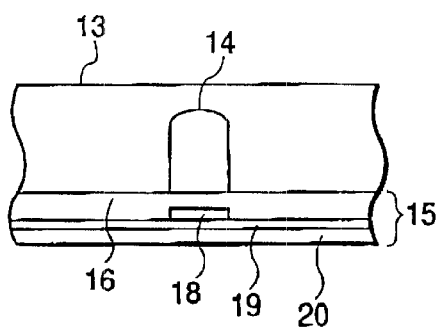
FIG. 2 is the lateral sectional view of a head of the ink-jet recording apparatus.
Figure 3:
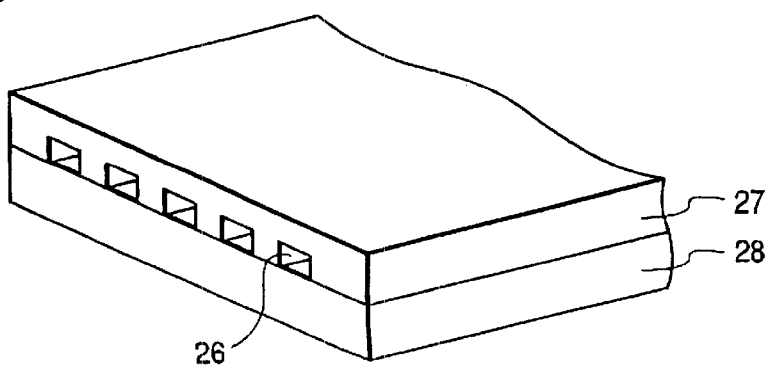
FIG. 3 is a perspective external view of the head of the ink-jet recording apparatus.

In the present invention, the ink-jet recording apparatus particularly preferred is of a type which ejects liquid droplets by thermal energy generated in correspondence with recording signals given to the recording ink in the recording head. FIGS. 1, 2 and 3 show an example of constitution of a recording heed, the main part of the apparatus. FIG. 1 is a sectional view of a head 13 along an ink flow path. FIG. 2 is a sectional view of the head taken along line 2—2 in FIG. 1.

The recording head 13 is constructed by bonding a plate of glass, ceramics, plastics, or the like having a groove 14 for ink flow with a heating head 15 having a heating resistor for thermosensitive recording (not limited to the thin film head shown in the drawing). The heating head 15 is constituted of a protection layer 16 formed from silicon oxide, or the like; aluminum electrodes 17-1, 17-2; a heating resistor layer 18 formed from nichrome or the like; a heat-accumulating layer 19; and a substrate 20 made of a heat-radiating material such as alumina.

A recording ink 21 reaches an ejection orifice 22 and forms there a meniscus 23 by Pressure P. On application of an electric signal information to the electrodes 17-1, 17-2 of the head 13, the region denoted by a symbol n on the heating head 15 generates heat abruptly to form a bubble in the ink there, the pressure of the bubble pushes out the meniscus 23 to eject the ink 21 through the ejection orifice 22 in a shape of droplets 24. The ejected ink droplet travels toward a recording medium 25.

FIG. 3 shows schematically a recording head having a plurality of nozzles shown in FIG. 1 as juxtaposed. The recording head is formed by bonding a glass plate 27 having a plurality of flow paths with a heat-generating head 28 like the one shown in FIG. 1.

Figure 4:
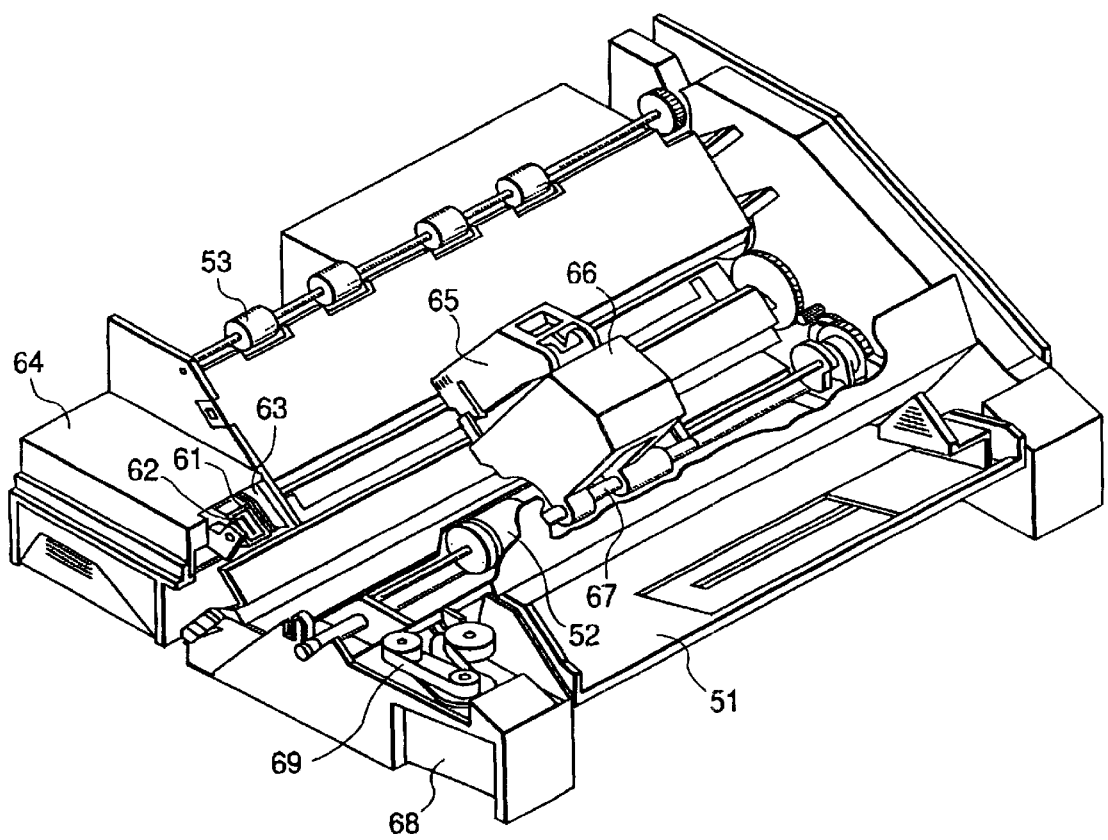
FIG. 4 is a perspective view of an ink-jet recording apparatus.

FIG. 4 shows an example of the entire of the ink-jet recording apparatus equipped with such a head. In FIG. 4, a blade 61 as a wiping member is held at one end of the blade by a blade-holding member, forming a fixed end in a shape of a cantilever. The blade 61 is placed at a position adjacent to the recording region of the recording head 65, and is held, in this example, so as to protrude into the moving path of the recording head 65. A cap 62 for capping the ejection face of the recording head 65 is placed at a home position adjacent to the blade 61, and is constituted such that it moves in the direction perpendicular to the moving direction of the recording head 65 to come into contact with the ink ejection face for the capping. An ink absorbent 63 is placed at a position adjacent to the blade 61, and is held so as to protrude into the moving path of the recording head 65 in a manner similar to that of the blade 61. The blade 61, the cap 62, and the ink absorbent 63 constitute an ejection recovery device 64. The blade 61, and the ink absorbent 63 serve to remove off water, dust, and the like from the face of the ink ejection opening.

The recording head 65 has an energy-generating means for the ejection, and conducts recording by ejecting the ink onto a recording medium opposing to the ejection opening face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery device 51 for delivery of a recording medium and a paper delivery roller 52 driven by a motor (not shown in the drawing) deliver a recording medium to the position opposing to the ejection opening face of the recording head 65. With the progress of the recording, the recording medium is delivered further to a paper discharge device provided with paper discharging rollers 53.

In the above constitution, when the recording head 65 returns-to the home position on completion of recording, the cap 62 of the ejection-recovery device 64 is receded from the moving path of the recording head 65, and the blade 61 is allowed to protrude to the moving path. Thereby, the ejecting opening face of the recording head 65 is wiped. To cap the ejection face of the recording head 65, the cap 62 protrudes toward the moving path of the recording head 65 to come into contact with the ejection opening face.

When the recording head 65 is moved from the home position to the record-starting position, the cap 62 and the blade 61 are at the same position as in the above-mentioned wiping step, so that the ejection opening face of the recording head 65 is wiped also in this movement. The recording head 65 is moved to the home position not only at the completion of the recording and at the time of ejection recovery, but is moved also at a predetermined time intervals during recording from the recording region. The ejection opening face is wiped by this movement.

Figure 5:
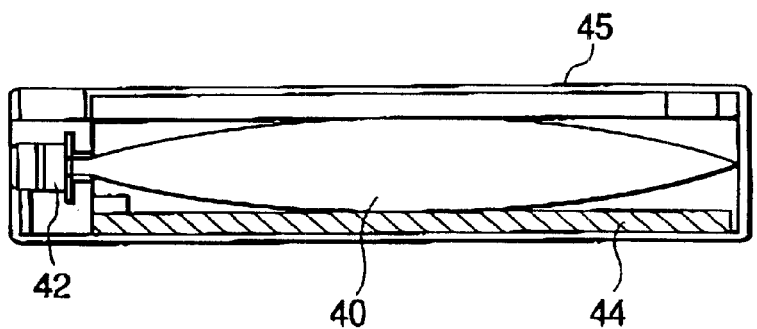
FIG. 5 is a vertical sectional view of an ink cartridge.
Figure 11:
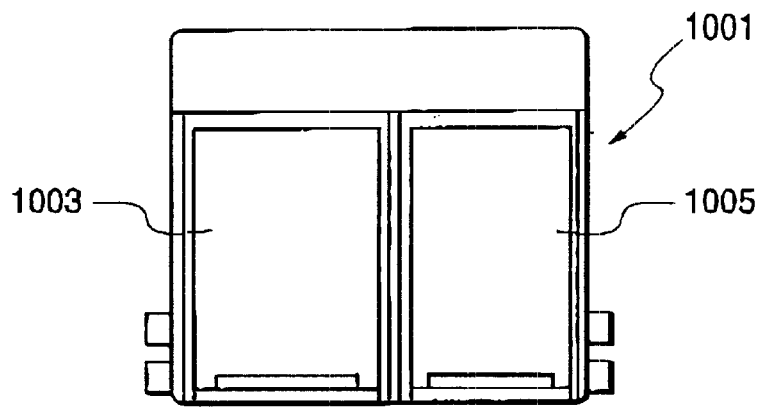
FIG. 11 is a rough sketch of an embodiment of an ink cartridge of the present invention.
Figure 12:
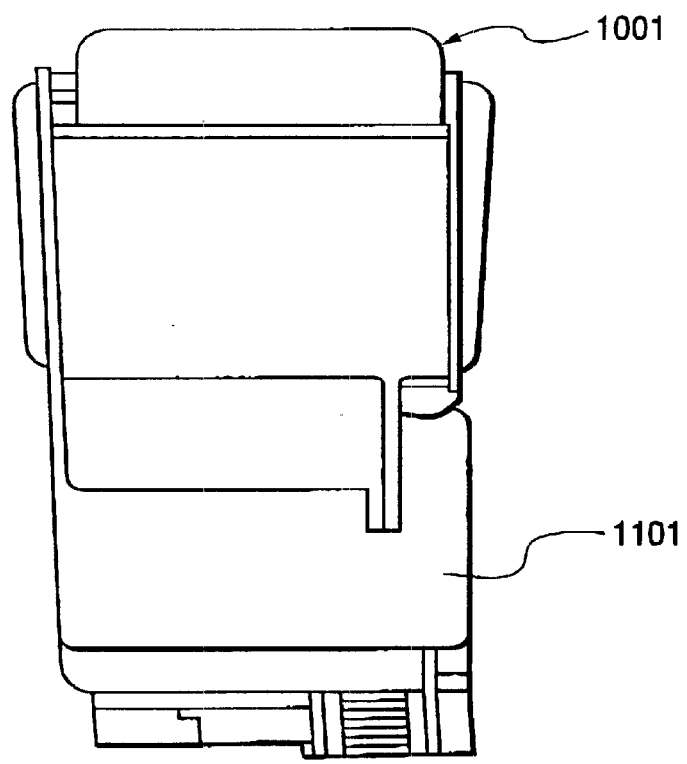
FIG. 12 is a rough sketch of a recording head equipped with the ink cartridge shown in FIG. 11.

FIG. 5 shows an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing)

into the plug 42 enables supply of the ink from the ink bag 40 to the head. A waste-ink absorbent 44 serves to receive waste ink. The liquid-contacting face of the ink container is preferably formed from polyolefin, especially polyethylene, in the present invention. Another embodiment of the cartridge of the present invention has two containers for storing separately an ink and the liquid composition for constituting the ink set of the present invention and is constructed so as to be detachable from the head for ejecting the ink and the liquid composition and capable of supplying the ink and the liquid composition to the recording head FIG. 11 shows an example of such a cartridge 1001, comprising an ink container 1003 storing the ink, and a liquid composition container 1005 containing the liquid composition. The cartridge is constituted as shown in FIG. 12 so as to be mountable on or detachable from a recording head 1101 for ejecting the ink and the liquid composition, and the cartridge 1001 attached to the recording head 1101 feeds the liquid composition and the ink to the recording head 1101.

Figure 6:
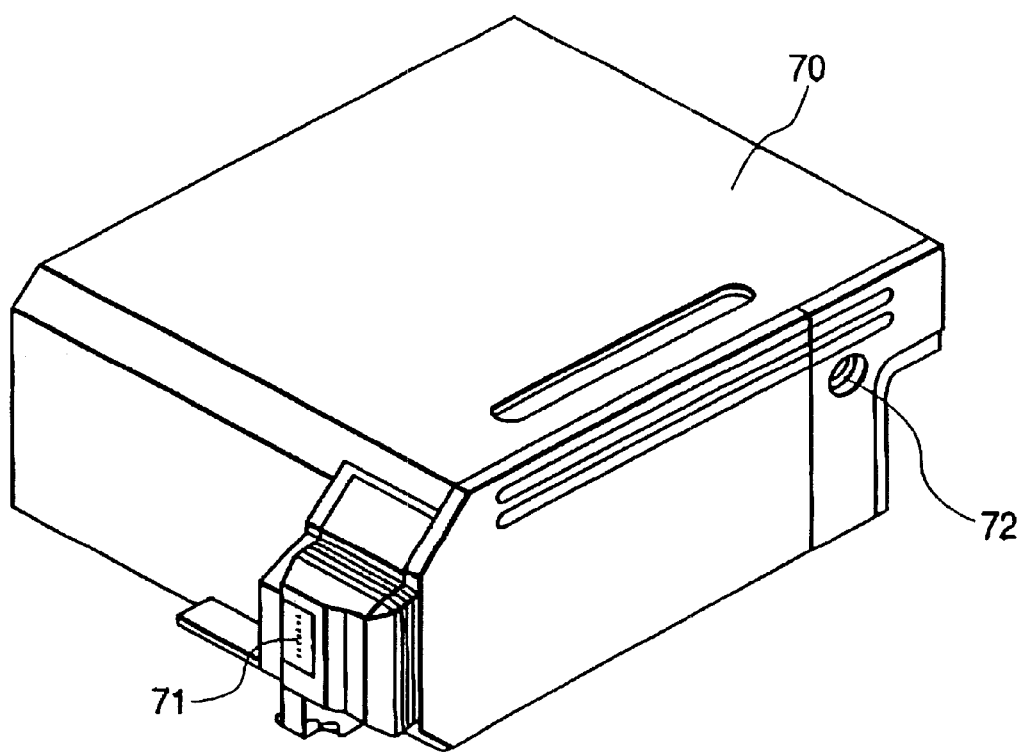
FIG. 6 is a perspective view of a recording unit.

The ink-jet recording apparatus used in the present invention is not limited to the above-mentioned one which has separately a head and an ink cartridge. Integration thereof as shown in FIG. 6 also may suitably be employed. In FIG. 6, a recording unit 70 houses an ink container containing the ink such as an ink absorbent, and the ink in the absorbent is ejected as on ink droplet through a plurality of orifices of a head 71. The ink absorbent is made preferably of a resin such as polyurethane. An air communication hole 72 allows the interior of the recording unit to communicate with the open air. This recording unit 70 is used in place of the recording head shown in FIG. 4, and is detachable from the carriage 66.

Figure 13:
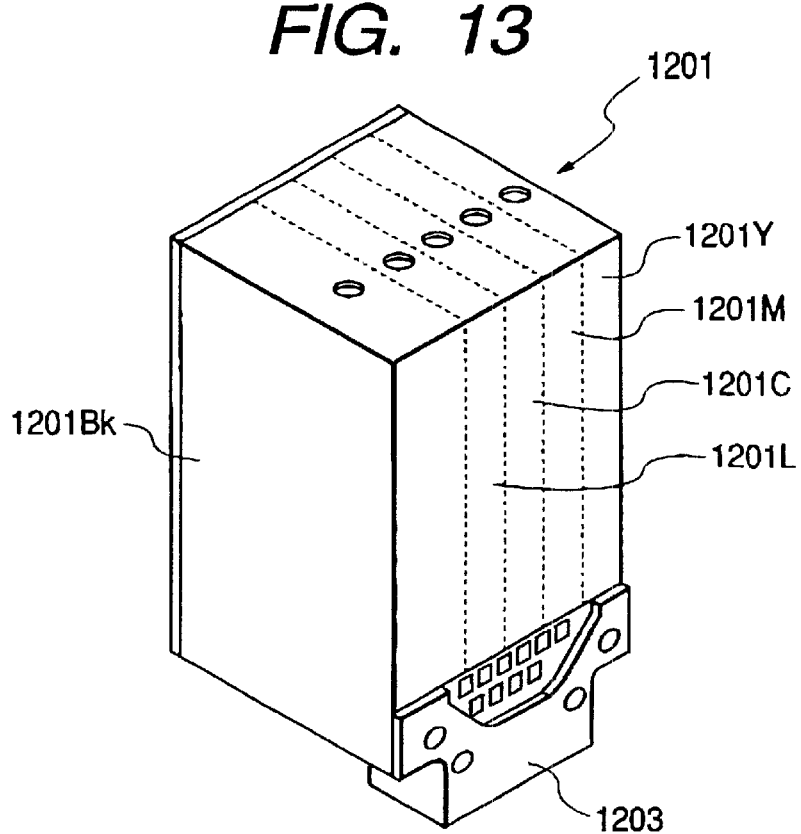
FIG. 13 is a rough sketch of an embodiment of a recording unit of the present invention.

A recording unit of another embodiment of the present invention is constructed by integration of an ink tank having container portions for storing respective inks and a liquid composition, and a recording head for ejecting the inks and the liquid composition separately. Specifically, as shown in FIG. 13, the recording unit 1201 is constructed in integration of a first container portion 1201L for the liquid composition, a second container portion 1201Bk for black ink, color ink container portions 1201Y, 1201M, and 1201C for yellow, magenta and cyan color inks; and a recording head 1203 having separate flow paths for the respective inks to eject separately the inks.

In the above description, an ink-jet recording apparatus is used as an example which ejects ink droplets by action of thermal energy applied to the ink and the liquid composition. However, a piezo type ink-jet recording apparatus employing a piezo element may also be used.

Figure 7:
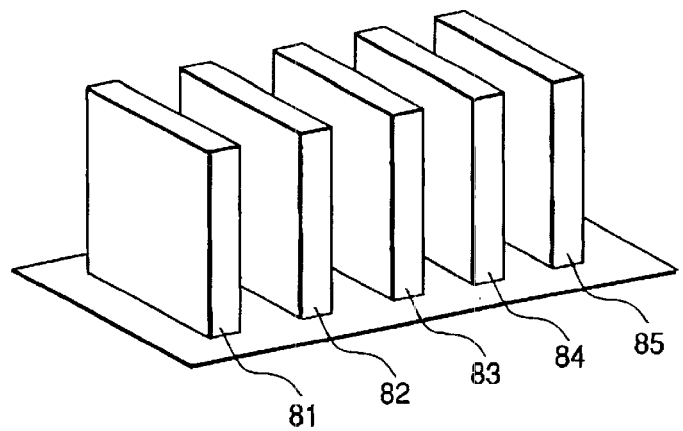
FIG. 7 is a perspective view of a recording unit having plural recording heads employed in an example of the present invention.
Figure 8:
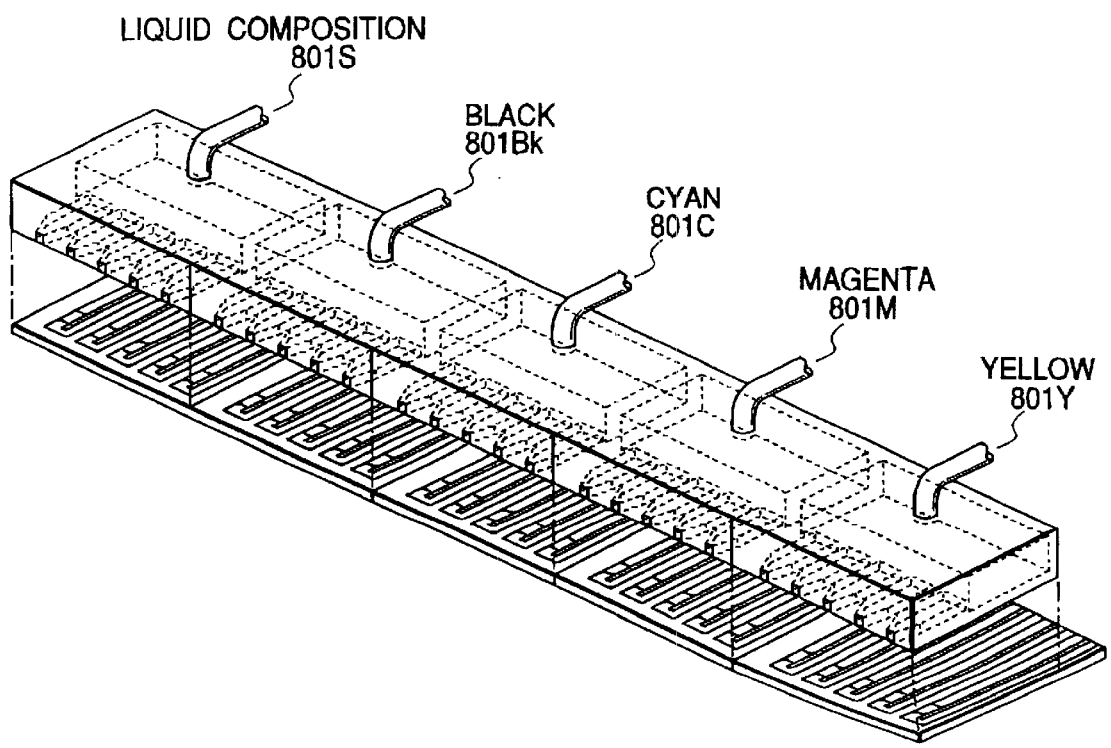
FIG. 8 is a perspective view of another recording head employed in the present invention.
Figure 9:
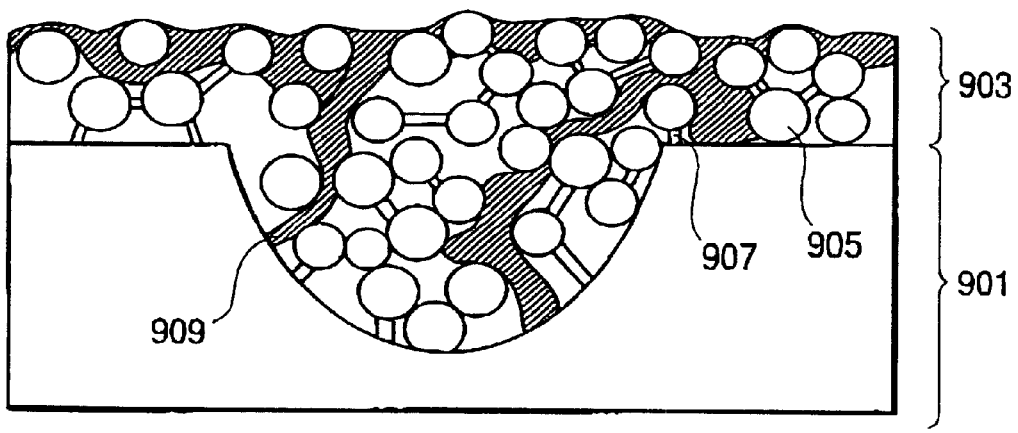
FIG. 9 is a schematic sectional view illustrating a state of a colored portion formed by ink-jet recording on a coated paper sheet.

For the formation of the colored area on a recording medium according to the present invention, a recording apparatus shown in FIG. 3, for example, is employed which has five recording heads on a carriage. FIG. 7 shows an example thereof. In FIG. 7, the recording heads 81, 82, 83, 84 eject respectively recording inks of yellow, magenta, cyan, or black, and the head 85 ejects the liquid composition used in the present invention. The heads are set in the above described recording apparatus and eject the recording inks of respective colors in accordance with recording signals. The liquid composition used in the present invention is applied, before the ejection of color ink, at least on the region where the inks are to be deposited on the recording paper. FIG. 7 shows an example of use of five recording heads, but the recording head is not limited thereto. FIG. 8 shows a preferred example of one recording head which has separate liquid flow paths for yellow 801Y, magenta 801M, cyan 801C, black 801Bk and the colorless liquid composition 801S. Naturally, the heads may be arranged to change the recording order reverse to that mentioned above.

Figure 16:
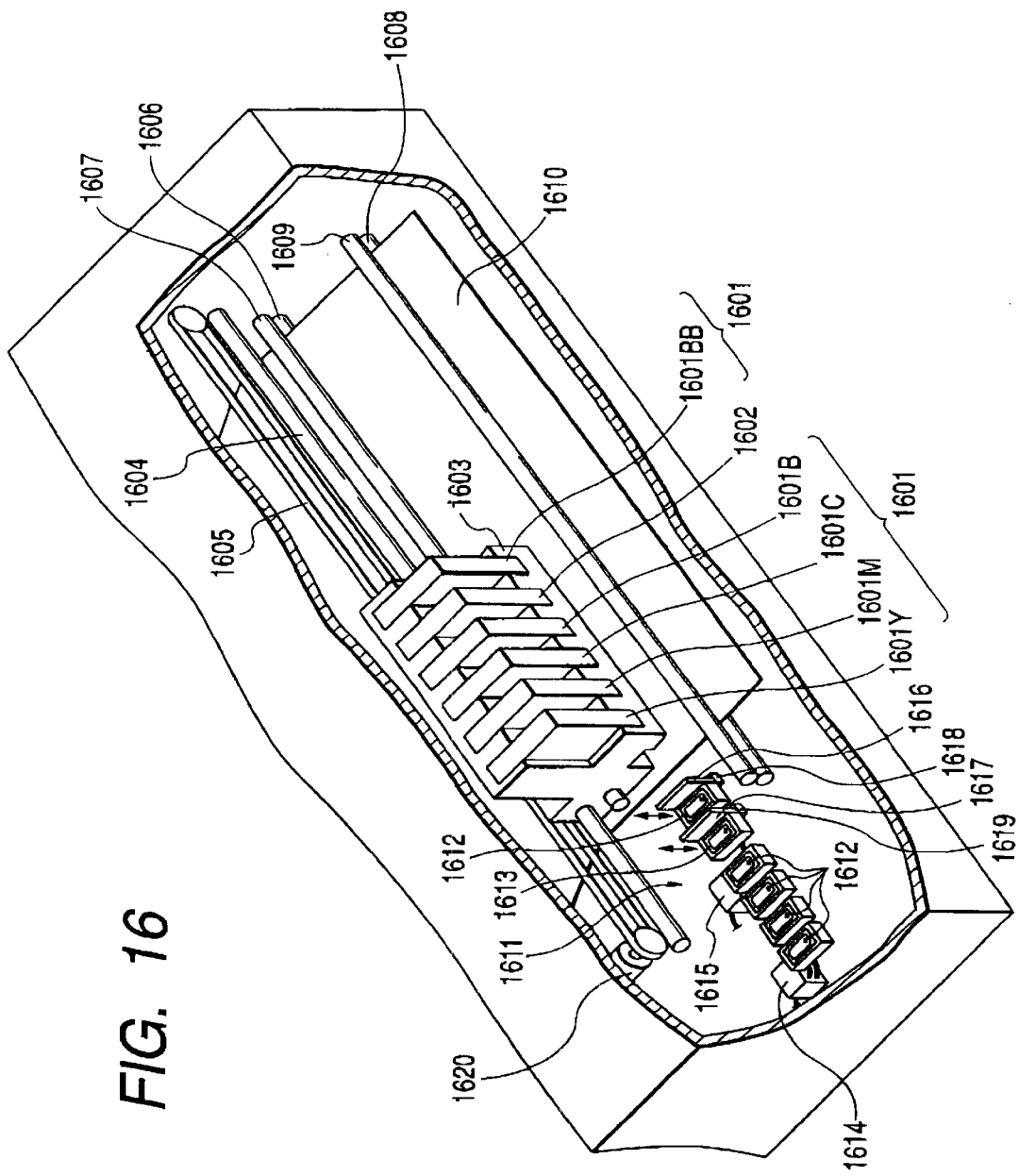
FIG. 16 is a partially exploded schematic perspective view of an embodiment of an ink-jet printing apparatus of the present invention.

FIG. 16 is a schematic perspective view of another embodiment of the ink-jet printing apparatus of the present invention.

In FIG. 16, a scanning rail 1604 extends in the scanning direction of a carriage 1603 and supports the carriage slidably. A driving belt 1605 transmits driving force to the carriage 1603 for reciprocating movement. Delivery roller pairs 1606, 1607, and 1608, 1609 are placed respectively on the front side and the rear side of the printing position to catch and deliver a printing medium 1610. The printing medium 1610 like paper is guided and supported by a platen (not shown in the drawing) in a press-contact state to keep the printed face flat. Head cartridges (heads) 1601, 1602 mounted on the carriage 1603 have ejection-orifice formation faces which are constructed so as to project downward from the carriage 1603 and between the recording medium delivery rollers 1607, 1609 to oppose in parallel to the recording medium 1610 pressed to the guide face of the platen (not shown in the drawing).

In FIG. 16, six head cartridges in total are mounted on the carriage 1603. In this example, a yellow print head 1601Y, a magenta print head 1601M, a cyan print head 1601C, a first black print head 1601B, a liquid composition ejection head 1602, and a second black print head 1601BB are arranged in the named order from left to right on the carriage 1603. The liquid composition ejection head 1602 ejects the liquid composition reactive to the dye in the ink onto the recording medium 1610. The second black print head 1601BB at the rightmost position is a-print head using a black ink used at the return scanning in reciprocating printing Thus the liquid composition ejection head 1602 is disposed next to (at the right side of) the black print head 1601B, and next to it (at the rightmost position) the second black print head 1601BB is disposed.

In FIG. 16, a recovery unit 1611 is placed at the left side of the printing region. In the recovery unit 1611, caps 1612 for capping the print heads 1601Y, 1601M, 1601C, 1601B are placed successively from left to right in correspondence with the arrangement of the head cartridge 1601, 1602. Adjacently thereto (at the right side), a cap 1613 is placed for capping the liquid composition ejection head 1602, and further at the right side thereof (at the rightmost position), a cap 1612 is placed for capping the second black print head 1601BB. The respective caps are movable upward and downward. When the carriage 1603 is at the home position, the caps 1612, 1613 are respectively allowed to press the orifice face of the heads 1601, 1602 to close tightly (to cap) the ejection orifices to prevent evaporation of the ink solvent at the ejection orifices, preventing viscosity Increase and/or solidifying of the inks and preventing the ejection failure.

The recovery unit 1611 is equipped with a suction pump 1614 communicating with the respective caps 1612, and a suction pump 1615 communicating with the cap 1613. When the ejection at the print head 1601 or the liquid composition ejection head 1602 fails, the pump 1614 or 1615 is used to carry out the sucking recovery treatment on the ejection orifice faces of those heads with capping with the cap 1612 or 1613. A blade 1617 for the liquid composition-ejection head 1602 is placed between the fifth cap 1613 from the left for the liquid composition and the sixth cap 1612 from the left (rightmost position). A blade 1616 for the print heads 1601 is placed at the right side (printing region side) of the rightmost cap 1612. The blade 1617 is held by a blade holder 1619, and the blade 1616 is held by a blade holder 1618. In this embodiment, the blade holders 1618, 1619 are respectively moved upward and downward by a blade-lifting mechanism (not shown in the drawing) driven by utilizing the movement of the carriage 1603, thereby being moved upward or downward between the protruding position (wiping position) to wipe off the ink and foreign matter adhering to the ejection orifice faces of the heads 1606, 1602, and the retreating position (standby position) not contacting with the ejection orifice face. In the blade movement, the blade 1616 for wiping the print heads 1601 and the blade 1617 for wiping the print head 1602 for ejection of the liquid composition are constructed to move upward and downward independently from each other.

Figure 17A:
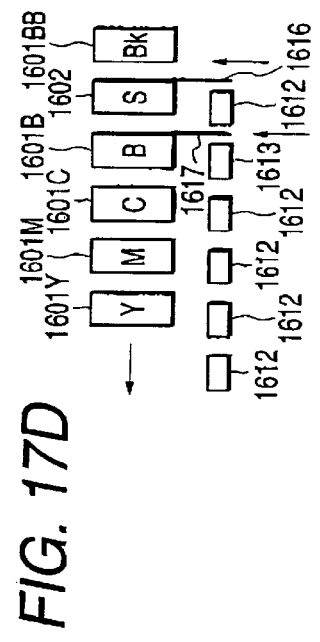
FIGS. 17A, 17B, 17C, 17D, 17E, and 17F are schematic drawings showing the operation of wiping in the ink-jet printing apparatus shown in FIG. 16.
Figure 17B:
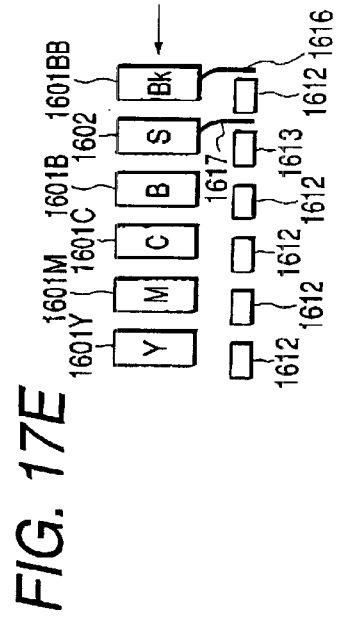
Figure 17D:
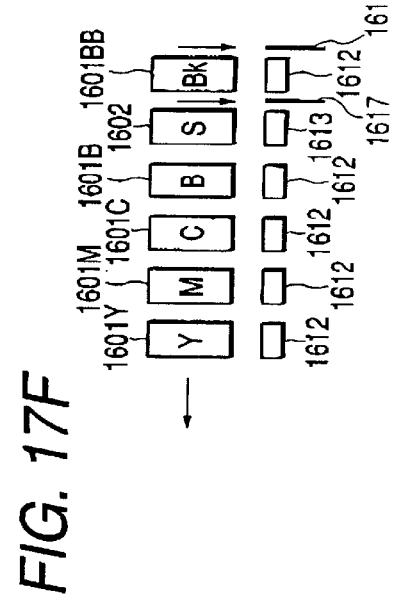
Figure 17C:
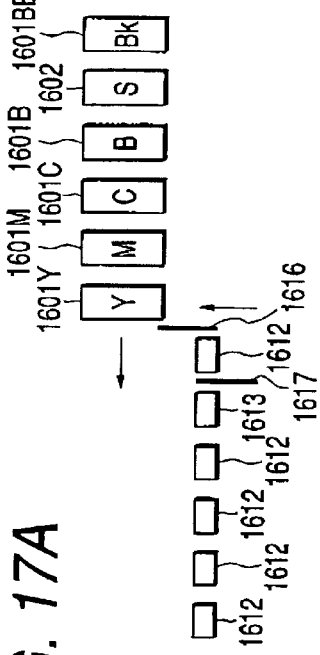
Figure 17E:
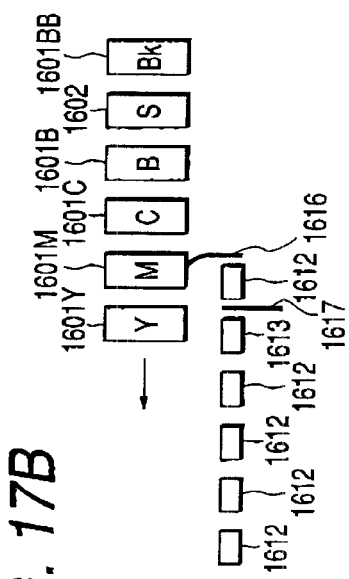
Figure 17F:
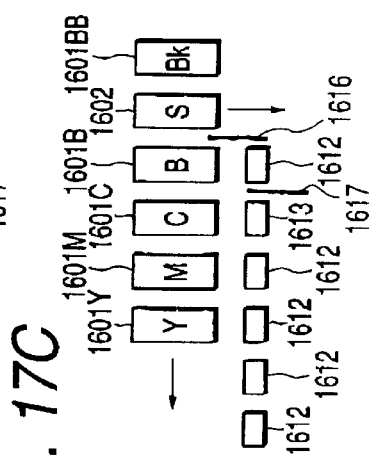

FIGS. 17A to 17F show schematically wiping operation in the ink-jet printing apparatus shown in FIG. 16. As shown In FIG. 17A, the blade 1616 for the print heads is allowed to protrude (to be lifted), and then the heads mounted on the carriage 1603 are moved from the right side toward the home position. The lifted blade 1616 for the print heads wipes the print heads 1601 successively with the leftward movement of the carriage 1603 as shown in FIG. 17B. At the time when the liquid composition ejection head 1602 has come to the position just before (right side of) the blade 1616 for the print heads, the blade 1616 is moved backward (lowered) to the standby position so that the blade 1616 is prevented from coming into contact with the liquid composition ejection head 1602 as shown in FIG. 17C. The carriage 1603 moves leftward, and at the time when the liquid composition ejection head 1602 has passed by the blade 1616 for the print heads, both the blade 1616 for the print heads and the blade 1617 for the liquid composition ejection head are allowed to protrude (to be lifted) as shown in FIG. 17D. Then, with leftward movement of the carriage 1603, the wiping of the liquid composition ejection head 1602 by the blade 1617 and the wiping of the rightmost print head 1601BB by the blade 1616 are simultaneously conducted as shown in FIG. 17E. When all of the heads 1606, 1602 have been wiped, the two blades 1616, 1617 are moved backward (lowered) to the standby position as shown in FIG. 17F.

In the Example of FIGS. 16 and 17A to 17F, the wiping is conducted with the movement of the carriage 1603 from the print region side (right side) to the home position side (side of the recovery unit 1611). However, the direction of the wiping is not limited thereto, and the wiping may be conducted with the movement of the carriage from the home position side to the right side (print region side).

The ink-jet printing apparatus shown in FIG. 16 is constituted to eject a liquid composition of the present invention reactive to a coloring material of an ink through a liquid composition ejection head 1602 onto a recording medium 1610 and to bring the liquid composition into contact with an ink ejected through the print head 1601 on the recording medium to form a record. The reaction of the coloring material in the ink with the liquid composition on the recording medium causes adsorption of the coloring material in the ink in a monomolecular state onto the surface of the fine particles to form an image with the aid of the fine particles. Therefore, the formed image is excellent in coloring property and color uniformity.

EXAMPLES

The present invention is described more specifically by reference to examples and comparative examples. In the description below, the units "parts" and "%" are based on weight unless otherwise mentioned.

The zeta potential was measured of the liquid composition of fine particles as dispersed in deionized water at a solid content of 0.1% by means of a-zeta potential tester (BI-ZETA plus, manufactured by Brookhaven Co.; at the liquid temperature of 20° C., in an acrylic cell). The pH was measured of the above liquid composition at a liquid temperature of 25° C. with a pH meter (Castany pH meter D-14, manufactured by Horiba Ltd.). The average particle diameter of the fine particles was measured of a liquid composition containing the fine particles dispersed in deionized water at a solid content of 0.1% by means of a dynamic light-scattering particle size distribution tester (BI-90, manufactured by Brookhaven; at a liquid temperature of 20° C. in an acrylic cell).

The preparation of the liquid composition used in the present invention is described below.

The components below were mixed and dissolved or dispersed, and the mixture was filtered with pressure by a membrane filter of the pore size of 1 $\mu$m (trade name: Fluoropore Filter, produced by Sumitomo Electric Industries, Ltd.) to obtain Liquid Compositions A, B, C, and D.

[Constitution of Liquid Composition A]

| | |
|---|---|
| Glycerol | 7.5 wt % |
| Diethylene glycol | 7.5 wt % |
| Alumina hydrate | 10.0 wt % |
| (Average particle diameter: 0.17 $\mu$m) | |
| Acetic acid | 3.0 wt % |
| Water | 72.0 wt % |

The alumina hydrate was synthesized as below.

Synthesis Example of Alumina Hydrate

Aluminum dodexide was prepared according to the method disclosed in U.S. Pat. No. 4,242,271. This aluminum dodexide was hydrolyzed according to the method disclosed in U.S. Pat. No. 4,202,870 to obtain an alumina slurry. To this alumina slurry, water was added to adjust the solid alumina hydrate content to 7.9 wt %. This alumina slurry showed pH of 9.3. The pH was adjusted by addition of a 3.9% nitric acid solution to obtain a colloidal sol. This colloidal sol was spray-dried at 83° C. to obtain alumina hydrate. The surface of this alumina hydrate came to be positively charged in water to be cationic.

The obtained Liquid Composition A had a pH of 3.5, and a zeta potential of +39 mV. this Liquid Composition A was subjected to a storage test in an ink tank at 60° C./dry for one month. After the test, no precipitation was observed in the ink tank, and the ejection from the recording head was stable.

[Constitution of Liquid Composition B]

| | |
|---|---|
| Glycerol | 7.5 wt % |
| Diethylene glycol | 7.5 wt % |
| Colloidal silica | 10.0 wt % |
| (Average particle diameter: 0.02 $\mu$m, | |
| trade name: Snowtex AK, Nissan Chem. Ind.) | |

-continued

| [Constitution of Liquid Composition B] | |
|---|---|
| Acetic acid | 3.0 wt % |
| Water | 72.0 wt % |

The above colloidal silica is a product having a cation-treated surface and is cationic in water.

The obtained Liquid Composition B had a pH of 3.7, and a zeta potential of +68 mV. This Liquid Composition B was subjected to a storage test in an ink tank at 60° C./dry for one month. After the test, no precipitation was observed in the ink tank, and the ejection from the recording head was stable.

| [Constitution of Liquid Composition C] | |
|---|---|
| Glycerol | 7.5 wt % |
| Diethylene glycol | 7.5 wt % |
| Alumina hydrate | 10.0 wt % |
| (Average particle diameter: 0.17 μm) | |
| Formic acid | 2.5 wt % |
| Water | 72.5 wt % |

The above alumina hydrate was the same as the one used in Liquid Composition A.

The obtained Liquid Composition C had a pH of 3.4, and a zeta potential of +39 mV. This Liquid Composition C was subjected to a storage test in an ink tank at 60° C./dry for one month. After the test, no precipitation was observed in the ink tank, and the ejection from the recording head was stable.

| [Constitution of Liquid Composition D] | |
|---|---|
| Glycerol | 7.5 wt % |
| Diethylene glycol | 7.5 wt % |
| Colloidal silica | 10.0 wt % |
| (Average particle diameter: 0.02 μm, trade name: Snowtex AK, Nissan Chem. Ind.) | |
| Formic acid | 2.5 wt % |
| Water | 72.5 wt % |

The above colloidal silica was the same as the one used in Liquid Composition B: a product having a cation-treated surface, and being cationic in water.

The obtained Liquid Composition D had a pH of 3.5, and a zeta potential of +68 mV. This Liquid Composition D was subjected to a storage test in an ink tank at 60° C./dry for one month. After the test, no precipitation was observed in the test ink tank, and the ejection from the recording head was stable.

Next, the preparation of ink Subsets 1 and 2 is described for use in examples of the present invention and comparative examples.

Preparation of Ink Subset 13

The components below were mixed and stirred to be dissolved, and the solution was filtered with pressure through Fluoropore Filter (trade name, pore size: 0.45 μm, Sumitomo Electric Ind.) to obtain a black dye ink (Bk1) and a cyan dye ink (C1). The combination of these dye inks was named ink Subset 1.

| (Black Ink Bk1) | |
|---|---|
| C.I. Direct Black 195 | 2.5 parts |
| 2-Pyrrolidone | 10 parts |
| Glycerol | 5 parts |
| Isopropyl alcohol | 4 parts |
| Sodium hydroxide | 0.4 parts |
| Water | 78.1 parts |

The above black ink Bk1 had a pH of 9.8. The black ink Bk1 was a pH-dependent dye, initiating dye aggregation at pH 7.5 (i.e., the dye beginning to aggregate at a pH of the solution lower than 7.5). The pHs of mixtures of the above Liquid Compositions A, B, C, and D with the black ink Bk1 at a mixing weight ratio of 1:1 were respectively 4.3; 4.6, 4.3; and 4.5.

| (Cyan Ink C1) | |
|---|---|
| CuPc (COOH)$_6$ | 3 parts |
| Ethylene glycol | 7 parts |
| Diethylene glycol | 10 parts |
| Acetylenol EH | 0.3 parts |
| (Kawaken Chemical K.K.) | |
| Water | 79.7 parts |

The above cyan ink C1 had a pH of 10.2. The cyan ink Cl was a pH-dependent dye, initiating dye aggregation at pH 8.0 (i.e., the dye beginning to aggregate at a pH of the solution lower than 8.0). The pHs of mixtures of the above Liquid Compositions A, B, C, and D with the cyan ink Cl at a mixing weight ratio of 1:1 were respectively 4.9; 5.1; 4.7; and 4.9.

The Liquid Compositions A–D and ink Subset 1 were combined to constitute an ink set of the present invention. Recording was conducted with this ink set on a PPC paper sheet (supplied by Canon K.K.). Color images were formed by an ink-jet recording apparatus similar to the one shown in FIG. 4 having five recording heads as shown in FIG. 8. In the recording, the liquid compositions were firstly applied on the recording paper sheets, and thereafter the inks were applied. Specifically, printing was conducted by three-pass fine printing mode with three-time scanning of the printing region. The liquid composition was applied in each pass onto the picture element position where any of the cyan ink or the black ink was to be applied. That is, in each pass, the logical sum of the printing data for cyan and black was employed as the printing data for the liquid composition. The fine mask in the fine printing is not limited, and conventional ones are useful; hence, explanation of those masks is omitted here.

The recording head employed here had a recording density of 600 dpi and was driven at a driving frequency of 9.6 Khz. With the head of 600 dpi, the amount of ejection for one dot was adjusted to 15 ng for the cyan ink and the liquid composition respectively, and 30 ng for the black ink These conditions were common throughout Example and Comparative Examples.

Examples 1–43

Printing was conducted with Liquid Compositions A, B. C, or D and ink Subset 1 (Bk1 and C1) prepared above. Table 1 shows the recording conditions.

TABLE 1

|  | Liquid Composition | Ink Subset |
|---|---|---|
| Example 1 | A | 1 |
| Example 2 | B | 1 |
| Example 3 | C | 1 |
| Example 4 | D | 1 |

Comparative Examples

Preparation of Ink Subset 23

The components below were mixed and stirred to be dissolved, and the solution was filtered with pressure through Fluoropore Filter (trade name, pore size: 0.45 µm, Sumitomo Electric Ind.) to obtain a black dye ink (Bk2) and a cyan dye ink (C2). The combination of these dye ink was named Ink Subset 2.

| (Black Ink Bk2) | |
|---|---|
| C.I. Food Black 2 | 2.5 parts |
| 2-Pyrrolidone | 10 parts |
| Glycerol | 5 parts |
| Isopropyl alcohol | 4 parts |
| Sodium hydroxide | 0.3 parts |
| Water | 78.2 parts |

The above black ink Bk2 had a pH of 9.5. The pH of the liquid mixture of Liquid Composition A with the black ink Bk2 at a mixing weight ratio of 1:1 was 4.2. Black Ink Bk2 had no aggregation-initiating pH for the dye.

| (Cyan Ink C2) | |
|---|---|
| C.I. Acid Blue 7 | 3 parts |
| Ethylene glycol | 7 parts |
| Diethylene glycol | 10 parts |
| Acetylenol EH (Kawaken Chemical K.K.) | 0.2 parts |
| Water | 79.8 parts |

The above cyan ink C2 had a pH of 10.0. The pH of the mixture of the above Liquid Compositions A with the cyan ink C2 at a mixing weight ratio of 1:1 was 4.8. Cyan ink C2 had no aggregation-initiating pH for the dye.

Printing was conducted with Ink Subsets 1 and 2, and Liquid Composition A Table 2 shows the recording conditions.

TABLE 2

|  | Liquid Composition | Ink Subset |
|---|---|---|
| Comparative example 1 | A | 2 |
| Comparative example 2 | none | 1 |

The recording with Ink Subset 1 and with Ink Subset 2 only (Comparative Examples 1 and 2) was conducted by use of a recording head of a recording density of 600 dpi at a driving frequency of 9.6 kHz. With the head of 600 dpi, the amount of ejection for one dot was about 15 ng for the cyan ink, and about 30 ng for the black ink. The recording was conducted under the same conditions as in Examples 1–4.

Evaluation

The recorded images formed in Examples 1–4 and Comparative Examples 1–2 were evaluated respectively by the evaluation method and the evaluation standards as shown below Table 3 shows the results

Evaluation Method and Standards for Recorded Images (1) Coloring Property:

Printing was conducted in half-tone patch patterns with the cyan ink by means of the aforementioned printer. Specifically, ten halftone patch patterns were printed by increasing the printing area ratios in 10% increments for each pattern to the solid patch pattern. The colors of the patches were measured. The coloring property was evaluated by calculating the chroma values of the respective patches. Specifically, the chroma value in Comparative Example 2 was taken as the reference, and the ratios to the reference of the corresponding chroma value in the Examples and Comparative Example were calculated and averaged In the measurement, printed images were obtained under the same image processing conditions. The color measurement was conducted 24 hours after the printing by means of GRETAG Spectrolino spectrophotometer with the light source D50 at the visual field of 2°. The measured results were outputted as CIE $L^*a^*b^*$-color space, and the chroma values were obtained from the square root of the sum of the squares of $a^*$ and $b^*$ values.

In printing on an ink-jet recording coated paper sheet (trade name: Color BJ paper LC-101, supplied by Canon K.K.) by use of Ink Subset 1, the average chroma ratio was 1.2 relative to that of the print of Comparative Example 2.

The evaluation standard is shown below.

A: Average chroma ratio is higher than 1.15.

B: Average chroma ratio is higher than 1.00 and not higher than 1.15.

C: Average chroma ratio is less than 1.00.

(2) Bleeding:

A solid cyan image and a black solid image were formed adjacently to each other with the aforementioned printer. The bleeding at the boundary between the two colors was visually evaluated.

The evaluation standard is shown below.

A: No bleeding is observed visually.

B: Little bleeding is observed.

C: Bleeding is practically of no problem.

D: Bleeding is remarkable with a vague boundary between colors.

(3) Uniformity:

A cyan solid image and a black solid image were formed with the aforementioned printer. The solid images were visually examined for white haze and color unevenness as the color uniformity. In this case, less uniform color image was evaluated. The evaluation standard is shown below.

A: White haze and color unevenness hardly occur.

B.: White haze and color unevenness occur to some extent along the paper fibers, but are practically of no problem.

C: White haze and color unevenness occur remarkably along the paper fibers.

(4) Rub-off resistance:

A cyan solid image and a black solid image were formed with the aforementioned printer. Sixteen (16) hours after the printing, a silbon paper sheet was placed on the printed area, and further thereon a weight of 3.5 cm×3.5 cm was placed to apply a pressure of 40 g/cm². In this state, the silbon paper sheet was pulled at a rate of 15 cm/sec. to evaluate the rub-off resistance of the printed area. Less resistant color image was evaluated. The evaluation standard is shown below.

A: The ink is hardly peeled off.

B: A small portion of the ink adheres to the silbon paper sheet, but the discoloration of the print is not noticeable.

C: A large amount of the ink adheres to the silbon paper sheet, and print area is discolored obviously.

(5) Texture:

A cyan solid image and a black solid image were formed with the aforementioned printer. The texture of the recording medium was visually evaluated The evaluation standard is shown below A: No incongruity is observed both in the printed area and in the unprinted area, and the texture of plain paper is kept remaining.

B: The texture is different between the printed area and the unprinted area, or the texture of the recording medium as a whole becomes different significantly from plain papers

TABLE 3

EVALUATION RESULTS

| | Coloring property | Bleeding | Uniformity | Rub-off resistance | Texture |
|---|---|---|---|---|---|
| Example | | | | | |
| 1 | A | A | A | A | A |
| 2 | A | A | A | A | A |
| 3 | A | A | A | A | A |
| 4 | A | A | A | A | A |
| Comparative Example | | | | | |
| 1 | A | C | A | A | A |
| 2 | C | D | C | A | A |

Effect of the Invention

As described above, the present invention provides an ink set comprising a liquid composition and an aqueous ink, and being capable of forming images with less bleeding at the color boundary, with broad color reproduction range comparable with the coated paper, with less white haze, less color unevenness, and superior color uniformity even in a shadow portion or a solid print portion where a larger amount of ink is applied. The present invention also provides a method of forming a colored area on a recording medium and an ink-jet recording apparatus.

According to the present invention, an ink-jet recorded image can be formed on a plain paper sheet by color ink-jet recording with superior coloring property and superior color uniformity comparable with recording on an ink-jet recording coated paper with the texture of the plain paper kept remaining, and with less streaky irregularity in a solid print portion and excellent rub-off resistance. Further, the present invention provides an ink set which is suitable for ink-jet recording, having excellent shelf stability of the ink and excellent ejection stability through a recording head.

What is claimed is:

1. An ink set comprising separately an aqueous anionic or cationic ink containing a coloring material, and a liquid composition containing fine particles dispersed therein and electrically charged at the surface in a polarity opposite to the ink, wherein the ink and the liquid composition are adjusted to give, when mixed at a mixing weight ratio of about 1:1, a pH of the liquid mixture to cause the aggregation of at least the coloring material.

2. The ink set according to claim 1, wherein the fine particles in the liquid composition adsorb the coloring material on the surface of the fine particles when mixed with the aqueous ink while preventing the aggregation of the coloring material.

3. The ink set according to claim 1 wherein the fine particles adsorb the coloring material in a monomolecular state on the surface of the fine particles at the time of forming a colored area.

4. The ink set according to claim 1, wherein the liquid composition has a zeta potential ranging from +5 to +90 mV.

5. The ink set according to claim 4, wherein the liquid composition contains an acid and is adjusted to have a pH in the range from 2 to 7.

6. The ink set according to claim 5, wherein the acid has a primary dissociation constant pKa of not higher than 5 in water.

7. The ink set according to claim 1, wherein the liquid composition has a zeta potential ranging from −5 to −90 mV.

8. The ink set according to claim 7, wherein the liquid composition contains a base, and is adjusted to have a pH in the range from 7 to 12.

9. The ink set according to claim 8, wherein the base has a primary dissociation constant pKb of not higher than 5 in water.

10. The ink set according to claim 1, wherein the fine particles in the liquid composition have an average particle diameter ranging from 0.005 to 1 μm.

11. The ink set according to claim 1, wherein the coloring material is a dye.

12. The ink set according to claim 1, wherein the ink is at least one selected from a yellow ink, a magenta ink, a cyan ink, a black ink, a red ink, a blue ink, and a green ink.

13. The ink set according to claim 4, wherein the ink contains an anionic compound.

14. The ink set according to claim 13, wherein the anionic compound contains at least one carboxylic acid group.

15. The ink set according to claim 4, wherein the ink contains a water-soluble dye having an anionic group.

16. The ink set according to claim 15, wherein the water-soluble dye having an anionic group contains at least one carboxylic acid group.

17. The ink set according to claim 7, wherein the ink contains a cationic compound.

18. The ink set according to claim 17, wherein the cationic compound has a cationic group.

19. A method of forming a colored area on a recording medium comprising a step of ejecting a droplet of an aqueous anionic or cationic ink and a droplet of a liquid composition to the recording medium in such a way that both of the droplets are brought into contact with each other in a liquid-liquid state on the recording medium, said aqueous ink containing a coloring material, said liquid composition containing fine particles dispersed therein and electrically charged at the surface in a polarity opposite to the ink, wherein the aqueous ink and the liquid composition are adjusted to give, when mixed at a mixing weight ratio of about 1:1, a pH of the liquid mixture to cause the aggregation of at least the coloring material.

20. The method of forming a colored area on a recording medium according to claim 19, wherein said step comprising applying a droplet of the liquid composition onto the recording medium and then applying a droplet of the aqueous ink onto the recording medium in such a way that said droplet is brought into contact with said liquid composition on the recording medium in a liquid-liquid state.

21. The method of forming a colored area on a recording medium according to claim 19, wherein said step comprising applying a droplet of the aqueous ink onto the recording medium and then applying a droplet of the liquid composition onto the recording medium in such a way that said droplet is brought into contact with said aqueous ink on the recording medium in a liquid-liquid state.

22. The method of forming a colored area on a recording medium according to claim 19, wherein said step comprising a first step of applying a droplet of the aqueous ink onto the recording medium, a second step of applying a droplet of the liquid composition onto the recording medium in such a way that said droplet is brought into contact, in a liquid-liquid state, with said aqueous ink on the recording medium thus applied in the first step, and a third step of applying further a droplet of the aqueous ink in such a way that said droplet is brought into contact, in a liquid-liquid state, with a liquid mixture of the aqueous ink and the liquid composition thus formed on the recording medium in the first and second steps.

23. The method of forming a colored area on a recording medium according to claim 19, wherein at least one of the application of the liquid composition droplet onto the recording medium and the application of the aqueous ink droplet onto the recording medium is conducted by an ink-jet recording system making use of ejection through an orifice in correspondence with a recording signal.

24. The method of forming a colored area on a recording medium according to claim 23, wherein the ink-jet system ejects the droplet upon the application of thermal energy.

25. An ink-jet recording apparatus comprising an ink set according to claim 1, containers for separately storing the aqueous ink and the liquid composition, each constituting the ink set, and heads for separately ejecting the liquid composition and the ink.

26. The ink-jet recording apparatus according to claim 25, wherein the heads are an ink-jet head.

27. An ink set comprising separately an anionic or cationic ink containing a coloring material, and a liquid composition containing fine particles reactive to the coloring material in a dispersion state, wherein the fine particles in the liquid composition are capable of adsorbing or bonding the coloring material in the ink on the surface of the fine particles with the coloring material maintaining the molecular state the coloring material has had in the ink when the ink and the liquid composition are mixed in a liquid state, and the ink and the liquid composition are adjusted to give, when mixed for a liquid-liquid reaction, a pH of the liquid mixture to cause the aggregation of the coloring material.

28. An ink set comprising separately an anionic or cationic ink containing a coloring material, and a liquid composition containing fine particles reactive to the coloring material in a dispersion state, wherein the fine particles in the liquid composition are capable of adsorbing or bonding the coloring material in the ink on the surface of the fine particles with the coloring material maintaining the molecular state the coloring material has had in the ink when the ink and the liquid composition are mixed in a liquid state, thereby making the dispersion state unstable to cause the aggregation of the fine particles, and the ink and the liquid composition are adjusted to give, when mixed for a liquid-liquid reaction, a pH of the liquid mixture to cause the aggregation of the coloring material.

29. An ink set comprising separately an anionic or cationic ink containing a coloring material, and a liquid composition containing fine particles reactive to the coloring material in a dispersion state, wherein the fine particles in the liquid composition are capable of adsorbing the coloring material in the ink in a monomolecular state on the surface of the fine particles when the ink and the liquid composition are mixed in a liquid state, and the ink and the liquid composition are adjusted to give, when mixed for a liquid-liquid reaction, a pH of the liquid mixture to cause the aggregation of the coloring material.

30. An image comprising a colored area, the colored area being formed by a liquid-liquid reaction of an anionic or cationic ink containing a coloring material with a liquid composition containing fine particles reactive to the coloring material in a dispersion state, wherein the colored area contains the fine particles having the coloring material adsorbed or bonded in a monomolecular state on the surface thereof, and an aggregate of the coloring material.

31. An ink set comprising separately an aqueous anionic or cationic ink containing a coloring material, and a liquid composition containing fine particles dispersed therein and electrically charged at the surface in a polarity opposite to the ink, wherein the pH of the ink and the pH of the liquid composition are adjusted respectively to give, when mixed at a mixing weight ratio of about 1:1, a pH of the liquid mixture to cause aggregation of the coloring material.

32. The ink set according to claim 1, wherein both the ink and the liquid composition are used for forming a colored area.

* * * * *

UNITED STATES PATENT AND TRADEMARK OFFICE
CERTIFICATE OF CORRECTION

PATENT NO.     : 6,460,989 B1
DATED          : October 8, 2002
INVENTOR(S)    : Kentaro Yano et al.

It is certified that error appears in the above-identified patent and that said Letters Patent is hereby corrected as shown below:

Column 1,
Line 9, "uniformity" should read -- uniformity.--;
Line 40, "image" should read -- image.--;
Line 43, "matters" should read -- matters. --; and
Line 61, "solvent" should read -- solvent. --.

Column 2,
Line 57, "above described" should read -- above-described --; and
Line 62, "Image" should read -- image --.

Column 3,
Line 35, "Into" should read -- into --; and
Line 61, "Which" should read -- which have --.

Column 4,
Line 6, "invention" should read -- invention. --; and
Line 11, "chrome" should read -- chroma --.

Column 6,
Line 65, "advantageously" should read -- advantageously. --.

Column 7,
Line 36, "chrome" should read -- chroma --; and
Line 62, "In" should read -- in --.

Column 8,
Line 63, "fiber" should read -- fiber. --.

Column 10,
Line 25, "Irregular" should read -- irregular --.

Column 11,
Line 22, "Itself" should read -- itself --;
Line 43, "therein" should read -- therein. --; and
Line 58, "potential" should read -- potential. --.

UNITED STATES PATENT AND TRADEMARK OFFICE
CERTIFICATE OF CORRECTION

PATENT NO.   : 6,460,989 B1
DATED        : October 8, 2002
INVENTOR(S)  : Kentaro Yano et al.

It is certified that error appears in the above-identified patent and that said Letters Patent is hereby corrected as shown below:

Column 13,
Line 17, "treatment" should read -- treatment. --;
Line 22, "matters" should read -- matters. --;
Line 47, "vented" should read -- vented. --; and
Line 61, "excellent" should read -- excellent. --.

Column 14,
Line 15, "includes" should read -- include --;
Line 21, "oleaic" should read -- oleic --; and
Line 30, "acid,," should read -- acid, --.

Column 15,
Lines 40-41, "and ¶ amino" should read -- and amino --;
Line 43, "nay" should read -- may --;
Line 53, "white" should read -- white. --; and
Line 57, "40 mN/rn" should read -- 40 mN/m --.

Column 16,
Line 27, "composition" should read -- composition. --.

Column 18,
Line 67, "compositions" should read -- composition. --.

Column 19,
Line 31, "above mentioned" should read -- above-mentioned --; and
Line 60, "preferably" should read -- preferably be --.

Column 20,
Line 17, "the" should read -- The --; and
Line 20, "solubility" should read -- solubility. --.

UNITED STATES PATENT AND TRADEMARK OFFICE
CERTIFICATE OF CORRECTION

PATENT NO.     : 6,460,989 B1
DATED          : October 8, 2002
INVENTOR(S)    : Kentaro Yano et al.

It is certified that error appears in the above-identified patent and that said Letters Patent is hereby corrected as shown below:

Column 21,
Line 20, "Its" should read -- its --; and
Line 58, "alkylsulf sodium polyoxyethylene alkyl ether sulfate,ate," should read -- alkylsulfate, --.

Column 22,
Line 39, "can" should read -- can be --.

Column 23,
Line 38, "ink" should read -- ink. --; and
Line 60, "subset"" should read -- subset". --.

Column 24,
Line 9, "Index" should read -- Index. --;
Line 18, "necessary" should read -- necessary. --;
Line 37, "methaorylate [CH$_2$=C(C$_3$)—" should read -- methacrylate [CH$_2$=C(CH$_3$)— --; and
Line 45, "acrylamidea" should read -- acrylamide --.

Column 25,
Line 13, "pigment" should read -- pigment. --;
Line 18, "group" should read -- group. --; and
Line 49, "above" should read -- above. --.

Column 26,
Line 12, "ink" should read -- ink. --; and
Line 24, "used" should read -- used. --.

Column 29,
Line 11, "head" should read -- head. --.

Column 30,
Line 34, "printing" should read -- printing. --.

UNITED STATES PATENT AND TRADEMARK OFFICE
CERTIFICATE OF CORRECTION

PATENT NO.   : 6,460,989 B1
DATED        : October 8, 2002
INVENTOR(S)  : Kentaro Yano et al.

It is certified that error appears in the above-identified patent and that said Letters Patent is hereby corrected as shown below:

Column 36,
Line 9, "results" should read -- results. --; and
Line 25, "averaged" should read -- averaged. --.

Column 37,
Line 20, "evaluated" should read -- evaluated. --;
Line 21, "below" should read -- below. --; and
Line 28, "papers" should read -- paper. --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,460,989 B1
DATED : October 8, 2002
INVENTOR(S) : Kentaro Yano et al.

It is certified that error appears in the above-identified patent and that said Letters Patent is hereby corrected as shown below:

Column 1,
Line 9, "uniformity" should read -- uniformity. --;
Line 40, "image" should read -- image. --;
Line 43, "matters" should read -- matters. --; and
Line 61, "solvent" should read -- solvent. --.

Column 2,
Line 57, "above described" should read -- above-described --; and
Line 62, "Image" should read -- image --.

Column 3,
Line 35, "Into" should read -- into --; and
Line 61, "Which" should read -- which have --.

Column 4,
Line 6, "invention" should read -- invention. --; and
Line 11, "chrome" should read -- chroma --.

Column 6,
Line 65, "advantageously" should read -- advantageously. --.

Column 7,
Line 36, "chrome" should read -- chroma --; and
Line 62, "In" should read -- in --.

Column 8,
Line 63, "fiber" should read -- fiber. --.

Column 10,
Line 25, "Irregular" should read -- irregular --.

Column 11,
Line 22, "Itself" should read -- itself --;
Line 43, "therein" should read -- therein. --; and
Line 58, "potential" should read -- potential. --.

UNITED STATES PATENT AND TRADEMARK OFFICE
CERTIFICATE OF CORRECTION

PATENT NO.   : 6,460,989 B1
DATED        : October 8, 2002
INVENTOR(S)  : Kentaro Yano et al.

It is certified that error appears in the above-identified patent and that said Letters Patent is hereby corrected as shown below:

Column 13,
Line 17, "treatment" should read -- treatment. --;
Line 22, "matters" should read -- matters. --;
Line 47, "vented" should read -- vented. --; and
Line 61, "excellent" should read -- excellent. --.

Column 14,
Line 15, "includes" should read -- include --;
Line 21, "oleaic" should read -- oleic --; and
Line 30, "acid,," should read -- acid, --.

Column 15,
Lines 40-41, "and ¶ amino" should read -- and amino --;
Line 43, "nay" should read -- may --;
Line 53, "white" should read -- white. --; and
Line 57, "40 mN/rn" should read -- 40 mN/m --.

Column 16,
Line 27, "composition" should read -- composition. --.

Column 18,
Line 67, "compositions" should read -- composition. --.

Column 19,
Line 31, "above mentioned" should read -- above-mentioned --; and
Line 60, "preferably" should read -- preferably be --.

Column 20,
Line 17, "the" should read -- The --; and
Line 20, "solubility" should read -- solubility. --.

Column 21,
Line 20, "Its" should read -- its --; and
Line 58, "alkylsulf sodium polyoxyethylene alkyl ether sulfate,ate," should read
-- alkylsulfate, --.

UNITED STATES PATENT AND TRADEMARK OFFICE
CERTIFICATE OF CORRECTION

PATENT NO. : 6,460,989 B1
DATED : October 8, 2002
INVENTOR(S) : Kentaro Yano et al.

It is certified that error appears in the above-identified patent and that said Letters Patent is hereby corrected as shown below:

Column 22,
Line 39, "can" should read -- can be --.

Column 23,
Line 38, "ink" should read -- ink. --; and
Line 60, "subset"" should read -- subset". --.

Column 24,
Line 9, "Index" should read -- Index. --;
Line 18, "necessary" should read -- necessary. --;
Line 37, "methaorylate [$CH_2=C(C_3)$—" should read
-- methacrylate [$CH_2=C(CH_3)$— --; and
Line 45, "acrylamidea" should read -- acrylamide --.

Column 25,
Line 13, "pigment" should read -- pigment. --;
Line 18, "group" should read -- group. --; and
Line 49, "above" should read -- above. --.

Column 26,
Line 12, "ink" should read -- ink. --; and
Line 24, "used" should read -- used. --.

Column 29,
Line 11, "head" should read -- head. --.

Column 30,
Line 34, "printing" should read -- printing. --.

Column 36,
Line 9, "results" should read -- results. --; and
Line 25, "averaged" should read -- averaged. --.

UNITED STATES PATENT AND TRADEMARK OFFICE
CERTIFICATE OF CORRECTION

PATENT NO. : 6,460,989 B1
DATED : October 8, 2002
INVENTOR(S) : Kentaro Yano et al.

It is certified that error appears in the above-identified patent and that said Letters Patent is hereby corrected as shown below:

Column 37,
Line 20, "evaluated" should read -- evaluated. --;
Line 21, "below" should read -- below. --; and
Line 28, "papers" should read -- paper. --.

Signed and Sealed this

Twelfth Day of August, 2003

JAMES E. ROGAN
*Director of the United States Patent and Trademark Office*